(12) United States Patent
Okada

(10) Patent No.: US 8,086,096 B2
(45) Date of Patent: Dec. 27, 2011

(54) SHAKE CORRECTION DEVICE AND IMAGING APPARATUS

(75) Inventor: Hiroyuki Okada, Osaka (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/651,538

(22) Filed: Jan. 4, 2010

(65) Prior Publication Data

US 2010/0172638 A1 Jul. 8, 2010

(30) Foreign Application Priority Data

Jan. 6, 2009 (JP) ................................. 2009-000513

(51) Int. Cl.
G03B 17/00 (2006.01)
(52) U.S. Cl. ...................................... 396/55; 348/208.12
(58) Field of Classification Search ..................... 396/55, 396/52, 90; 348/208.11
See application file for complete search history.

(56) References Cited

U.S. PATENT DOCUMENTS

| | | | | |
|---|---|---|---|---|
| 5,732,291 A | * | 3/1998 | Ohishi | 396/55 |
| 5,903,783 A | * | 5/1999 | Kanbayashi et al. | 396/55 |
| 6,654,554 B2 | * | 11/2003 | Uenaka | 396/55 |
| 6,704,501 B1 | * | 3/2004 | Washisu | 396/55 |
| 7,443,422 B2 | * | 10/2008 | Usui | 348/208.11 |
| 2006/0056831 A1 | * | 3/2006 | Horio et al. | 396/55 |
| 2006/0285837 A1 | * | 12/2006 | Mashima et al. | 396/55 |

FOREIGN PATENT DOCUMENTS

JP 2005-043625 A 2/2005

* cited by examiner

Primary Examiner — Clayton E Laballe
Assistant Examiner — Leon W Rhodes, Jr.
(74) Attorney, Agent, or Firm — Wolf, Greenfield & Sacks, P.C.

(57) ABSTRACT

A shake correction device includes: a first driving means for driving an imaging component, which is related with either an imaging optical system or an imaging device, in a first direction; a second driving means for driving the imaging component in a second direction which is different from the first direction; and a control means for correcting shake of the imaging apparatus by driving the imaging component on the basis of a detection result of the shake of the imaging apparatus, which is obtained by a shake detection means, using the first and second driving means, wherein the control means sequentially executes first return processing in the first direction using the first driving means and second return processing in the second direction using the second driving means when returning the imaging component to a reference position at a predetermined timing.

14 Claims, 23 Drawing Sheets

SHAKE CORRECTION DEVICE AND IMAGING APPARATUS

BACKGROUND OF THE INVENTION

1. Field of the Invention

The present invention relates to a technique of correcting shake of an imaging apparatus (for example, a digital camera).

2. Description of the Related Art

There is a technique of correcting shake of an imaging apparatus by driving an imaging device or the like in the imaging apparatus.

For example, a shake correction operation is executed by detecting the shake of an imaging apparatus using a shake detection sensor (for example, an angular velocity sensor) and driving an imaging device in order to remove the detected shake. More specifically, in order to correct shake of an imaging apparatus, an imaging device is disposed within the plane perpendicular to the optical axis and the imaging device is driven in two perpendicular directions within the plane.

In addition, in such a shake correction technique, an imaging device moves within the limited movable range. Moreover, in order to ensure the maximum movable range of an imaging device at a certain point of time, an operation (specifically, a centering operation) of returning the center of the imaging device to the reference position (for example, the optical axis position within the plane) at a predetermined timing is executed.

For example, JP-A-2005-43625 discloses a technique of moving an imaging device to the center position immediately before an exposure operation. Moreover, in such a technique, the imaging device is simultaneously driven in two perpendicular directions within the plane, which is perpendicular to the optical axis, for centering. In addition, a technique of moving an imaging device to the center position immediately after an exposure operation may also be considered, although it is different from the technique disclosed in JP-A-2005-43625.

SUMMARY OF THE INVENTION

In the imaging apparatus, however, not only the centering operation but also various operations, such as a mirror driving operation, a diaphragm operation, an AF motor driving operation, and a pixel value reading operation, are executed before and after an actual photographing operation (exposure operation). In addition, electric power is supplied from a power supply battery in these various operations.

In addition, the battery capacity may be reduced for many reasons, for example, due to the demands for a reduction in the size of a battery in recent years. In this case, the instantaneous maximum permissible value of a current supplied from the battery has also been reduced in many cases.

If the above centering operation and an operation other than the centering operation are executed in parallel (simultaneously) in such conditions, the situation may occur in which the total current consumed in various operations exceeds the maximum permissible value of the supply current. For example, when executing a reading operation of a pixel value (pixel data) from an imaging device and the above centering operation simultaneously immediately after an exposure operation, the total current consumed in both the operations may exceed the maximum permissible value.

Moreover, in order to avoid such a situation, the centering operation may be performed after the end of the pixel value reading processing (that is, both the operations may be sequentially performed). In this case, however, a time until both the operations are completed is longer. As a result, a problem occurs, for example, in which a time until the next actual photographing operation becomes possible is longer.

In addition, such a problem may occur not only in the case where a return operation (for example, a centering operation) of returning an imaging component (for example, an imaging device) to the reference position and a reading operation of the pixel value are simultaneously executed but also in the case where the centering operation and other operations (power supply operation) are simultaneously executed.

Therefore, it is desirable to provide a technique for making it easy to simultaneously execute a return operation (for example, a centering operation) of returning an imaging component to the reference position and an operation other than the return operation when performing the return operation.

According to embodiments of the present invention, there are provided an imaging apparatus and a shake correction device each including: a first driving means for driving an imaging component, which is related with either an imaging optical system or an imaging device, in a first direction; a second driving means for driving the imaging component in a second direction which is different from the first direction; and a control means for correcting shake of the imaging apparatus by driving the imaging component on the basis of a detection result of the shake of the imaging apparatus, which is obtained by a shake detection means, using the first and second driving means. The control means sequentially executes first return processing in the first direction using the first driving means and second return processing in the second direction using the second driving means when returning the imaging component to a reference position at a predetermined timing.

According to the embodiments of the present invention, since the total instantaneous current consumption is reduced when performing the return operation of returning the imaging component to the reference position, it is possible to improve the tolerance of simultaneous execution of the return operation and an operation other than the return operation.

DESCRIPTION OF THE PREFERRED EMBODIMENTS

Hereinafter, best modes for carrying out the present invention (also refer to as embodiments) will be described. In addition, the explanation is performed in the following order, that is, in order of 1. first embodiment (example in which return processing is performed sequentially in yaw direction and pitch direction), 2. second embodiment (example in which a total of three return processing including preliminary return processing is performed), 3. third embodiment (example in which the allowable range in preliminary return processing changes), 4. fourth embodiment (example in which return processing is performed three times in different driving orders), 5. fifth embodiment (example in which one of two kinds of driving orders is selected), and 6. modification.

1. First Embodiment

Figure 1:
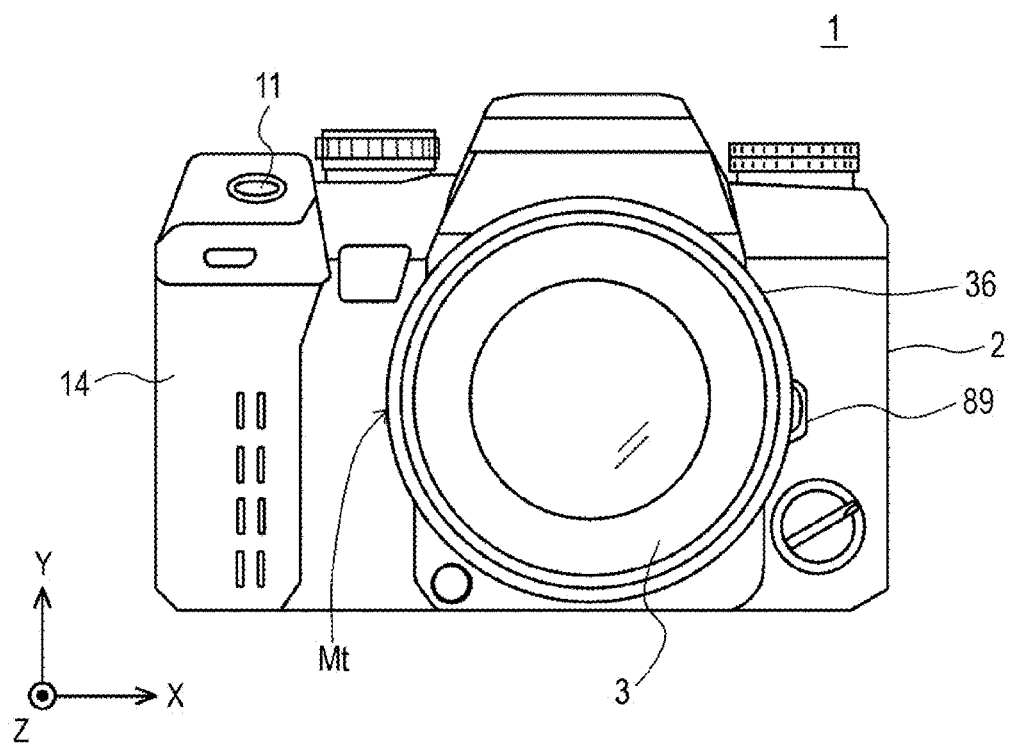
FIG. 1 is a front view illustrating the outer appearance of an imaging apparatus.
Figure 2:
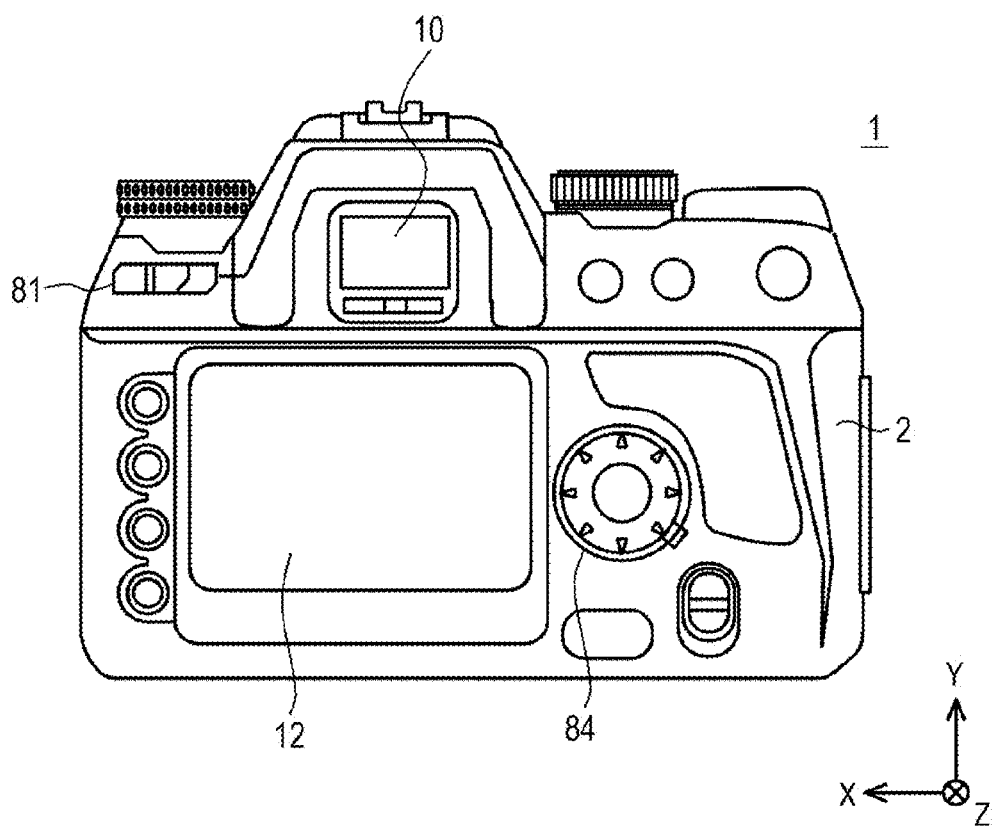
FIG. 2 is a back view illustrating the outer appearance of the imaging apparatus.

Hereinafter, embodiments of the present invention will be described with reference to the accompanying drawings.
<1-1. Outline of Configuration>
FIGS. 1 and 2 are views illustrating the configuration of the outer appearance of an imaging apparatus 1 according to an embodiment of the present invention. Here, FIG. 1 is a front view illustrating the outer appearance of the imaging apparatus 1, and FIG. 2 is a back view illustrating the outer appearance of the imaging apparatus 1. This imaging apparatus 1 is formed as a lens-replaceable single lens reflex type digital camera.

As shown in FIG. 1, the imaging apparatus 1 includes a camera body unit (camera body) 2. A replaceable photographing lens unit (replaceable lens) 3 may be attached to the camera body unit 2 or detached from the camera body unit 2.

The photographing lens unit 3 is mainly configured to include a barrel 36 and a lens group 37 (refer to FIG. 3), a diaphragm, and the like which are provided inside the barrel 36. The lens group 37 (imaging optical system) includes a focus lens which moves in the optical axis direction to change the focal position.

The camera body unit 2 includes a circular mount section Mt, which is provided in the approximate middle and in which the photographing lens unit 3 is mounted, and an attaching/detaching button 89 for attaching or detaching the photographing lens unit 3, which is provided near circular mount section Mt.

In addition, the camera body unit 2 includes a grip section 14 for grip of a photographer, which is provided at the front left end. A release button 11 for instructing the start of exposure is provided on the upper surface of the grip section 14. A battery housing room and a card housing room are provided inside the grip section 14. In the battery housing room, a battery, such as a lithium ion battery, is housed as a power source of a camera. In the card housing room, a memory card 90 (refer to FIG. 3) for recording the image data of a photographed image is detachably housed.

The release button 11 is a two-step detection button which can detect two states of a half-press state S1 and a full-press state S2. The release button 11 receives a photographing preparation command D1 and a photographing start command D2 according to the detection result of both the states S1 and S2.

When the release button 11 is half-pressed to change to the half-press state S1, the imaging apparatus 1 determines that the photographing preparation command (also referred to as an exposure preparation command) D1 has been given by the operator. Then, in response to the photographing preparation command D1, a preparatory operation (for example, an AF control operation and an AE control operation) for acquiring a still image (actual photographing image) for recording regarding a subject is performed.

In addition, when the release button 11 is further pressed to change to the full-press state S2, the imaging apparatus 1 determines that the photographing start command (also referred to as an exposure start command) D2 has been given by the operator. Then, in response to the photographing start command D2, a photographing operation (a series of operations in which an exposure operation regarding a subject image (light image of a subject) is performed using an imaging device 5 (which will be described later) and predetermined image processing is performed on an image signal obtained by the exposure operation) of the actual photographing image is performed.

Referring to FIG. 2, a finder window (eyepiece window) 10 is provided in the approximately middle upper portion of the back surface of the camera body unit 2. The photographer can perform composition determination by viewing the light image of the subject, which has been guided from the photographing lens unit 3, through the finder window 10. That is, the composition preparation can be performed using an optical finder.

Referring to FIG. 2, a back monitor 12 is provided in the approximate middle of the back surface of the camera body unit 2. The back monitor 12 is formed using a color liquid crystal display (LCD), for example. The back monitor 12 can display a menu screen for setting the photographing conditions and the like and can reproduce and display a photographed image recorded in the memory card 90 in the reproduction mode.

A main switch 81 is provided in an upper left portion of the back monitor 12. The main switch 81 is a two-point slide switch. When the contact point is set to "OFF" position on the left, the power is turned off. When the contact point is set to "ON" position on the right, the power is turned on.

A direction selection key 84 is provided at the right side of the back monitor 12. The direction selection key 84 has a circular operation button and is configured to be able to detect a pressure operation of the operation button in four directions of upper, lower, left, and right directions and a pressure operation of the operation button in four directions of upper right, upper left, lower right, and lower left. Moreover, the direction selection key 84 can also detect a pressure operation of a push button in the middle portion in addition to the pressure operations in the eight directions described above.

<1-2. Functional Block>

Figure 3:
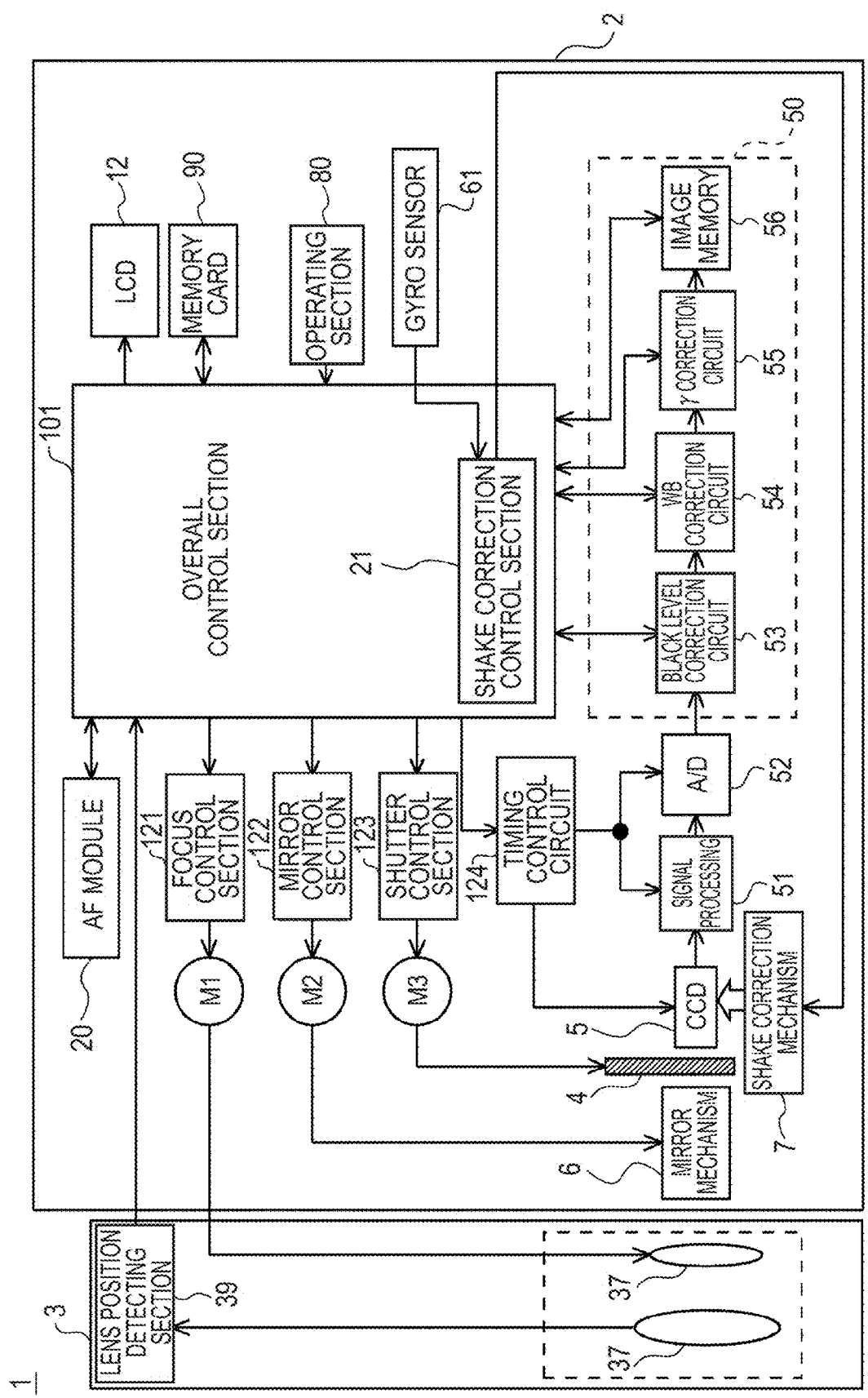
FIG. 3 is a block diagram illustrating the functional configuration of the imaging apparatus.

Next, the outline of a function of the imaging apparatus 1 will be described with reference to FIG. 3. FIG. 3 is a block diagram illustrating the functional configuration of the imaging apparatus 1.

As shown in FIG. 3, the imaging apparatus 1 includes an operating section 80, an overall control section 101, a focus control section 121, a mirror control section 122, a shutter control section 123, a timing control circuit 124, and a digital signal processing circuit 50.

The operating section 80 includes various buttons including the release button 11 (refer to FIG. 1), switches, and the like. In response to a user's input operation using the operating section 80, the overall control section 101 realizes various operations.

The overall control section 101 is formed by a microcomputer and mainly includes a CPU, a memory, ROM, and the like. The overall control section 101 realizes various kinds of functions by reading a program stored in the ROM and executing the program by the CPU.

The overall control section 101 realizes each processing section including a shake correction control section 21. The shake correction control section 21 has a function of driving the imaging device 5 using a shake correction mechanism 7 (will be described later) and of optically correcting shake (shake of the imaging apparatus 1) detected by an angular velocity sensor (gyro sensor) 61. The shake correction mechanism 7 (refer to FIG. 4) has a position sensor 69 (refer to FIG. 5) which detects each position (position in the X direction and position in the Y direction) of the imaging device 5 in two different directions (specifically, two perpendicular directions within the plane which is perpendicular to the optical axis). Using a detection result from the position sensor, the shake correction control section 21 controls the position of the imaging device 5 according to a feedback control rule, for example. In addition, in the present embodiment, a shake correction device is formed by the shake correction control section 21, shake correction mechanism 7, and the like.

In addition, the overall control section 101 cooperates with an AF module 20 and the focus control section 121 in order to perform a focus control operation of controlling the position of a focus lens. According to the focusing state of a subject detected by the AF module 20, the overall control section 101 realizes an automatic focus operation (AF operation) using the focus control section 121. In addition, using the light which is incident through a mirror mechanism 6, the AF module 20 can detect the focusing state of the subject by a focusing state detection method, such as a phase difference method.

The focus control section 121 moves the focus lens included in the lens group 37 of the photographing lens unit 3 by generating a control signal on the basis of a signal input from the overall control section 101 and driving a motor M1. In addition, the position of the focus lens is detected by a lens position detecting section 39 of the photographing lens unit 3, and data indicating the position of the focus lens is transmitted to the overall control section 101. Thus, the focus control section 121, the overall control section 101, and the like control the movement of the focus lens in the optical axis direction.

The mirror control section 122 controls state switching between a state (mirror-up state), in which the mirror mechanism 6 has retreated from the optical path, and a state (mirror-down state), in which the mirror mechanism 6 blocks the optical path. The mirror control section 122 performs switching between the mirror-up state and the mirror-down state by generating a control signal on the basis of a signal input from the overall control section 101 and driving a motor M2.

In addition, the mirror mechanism 6 has a main mirror (main reflecting surface) and a sub-mirror (sub-reflecting surface). In the mirror-down state, the main mirror and the sub-mirror of the mirror mechanism 6 are disposed on the optical path of the corresponding light. Moreover, the light (subject image) from the photographing lens unit 3 is reflected toward the upper portion of the camera by the main mirror and is then reflected further by a pentagonal mirror disposed in the upper portion of the camera body unit 2. Then, the light is guided as observation light to the finder window 10. In addition, some light beams from the photographing lens unit 3 are reflected by the sub-mirror and guided to the AF module 20 disposed in the lower portion of the camera body unit 2 so as to be used for the AF operation. On the other hand, in the mirror-up state, the main mirror and the sub-mirror retreat from the optical path of the subject image from the photographing lens unit 3, and the subject image moves toward a shutter 4 and the imaging device 5.

The shutter control section 123 controls opening and closing of the shutter 4 by generating a control signal on the basis of a signal input from the overall control section 101 and driving a motor M3. In addition, in a state where the shutter 4 is opened, a subject image reaches the imaging device 5 and an exposure operation is realized for an exposure period.

The timing control circuit 124 performs timing control of the imaging device 5 and the like.

The imaging device 5 generates an image signal by performing photoelectric conversion of a light image of the subject. Specifically, the imaging device (here, a CCD sensor (also simply referred to as a CCD)) 5 generates an image signal (image signal for recording), which is related to an actual photographing image, by converting the light image of the subject into an electric signal by a photoelectric conversion operation.

The imaging device 5 generates an image signal related to the subject image by performing exposure (accumulation of electric charges based on photoelectric conversion) of the subject image, which has been formed on a light receiving surface, in response to a driving control signal (accumulation start signal and accumulation end signal) input from the timing control circuit 124. In addition, the imaging device 5 outputs the image signal to a signal processing section 51 in response to a reading control signal input from the timing control circuit 124. In addition, a timing signal (synchronization signal) from the timing control circuit 124 is also input to the signal processing section 51 and an A/D (analog/digital) conversion circuit 52.

The signal processing section 51 performs predetermined analog signal processing on the image signal acquired by the imaging device 5, and the image signal after the analog signal processing is converted into digital image data (image data) by the A/D conversion circuit 52. The image data is input to the digital signal processing circuit 50.

The digital signal processing circuit 50 generates the image data regarding the imaged image by performing digital signal processing on the image data input from the A/D conversion circuit 52. The digital signal processing circuit 50 includes a black level correction circuit 53, a white balance (WB) correction circuit 54, a γ correction circuit 55, and an image memory 56.

The black level correction circuit 53 corrects a black level of each pixel data, which forms the image data output from the A/D conversion circuit 52, to a reference black level. The WB correction circuit 54 adjusts the white balance of an image. The γ correction circuit 55 converts the gray scale of the imaged image. The image memory 56 is a high-accessible image memory for temporarily storing the generated image data and has a capacity sufficient to store the image data corresponding to a plurality of frames.

In actual photographing, the image data which is temporarily stored in the image memory 56 is stored in the memory card 90 after being subjected to appropriate image processing (including compression processing or the like) by the overall control section 101.

In addition, the image data which is temporarily stored in the image memory 56 is appropriately transmitted to a VRAM (not shown) by the overall control section 101, and an image based on the image data is displayed on the back monitor 12. Thus, check display (afterview) for checking an image to be photographed, reproduction display for reproducing a photographed image, and the like are realized.

In addition, the imaging device 5 is driven by the shake correction control section 21 and the shake correction mechanism 7. Specifically, the imaging device 5 is driven so that the detected shake is removed by the angular velocity sensor 61. As a result, shake in the imaging apparatus is corrected.

<1-3. Shake Correction Mechanism>

Next, the shake correction mechanism 7 will be described. The shake correction mechanism 7 is a mechanism which corrects the shake of the imaging apparatus 1 (imaging device 5) by driving the imaging device 5.

Figure 4:
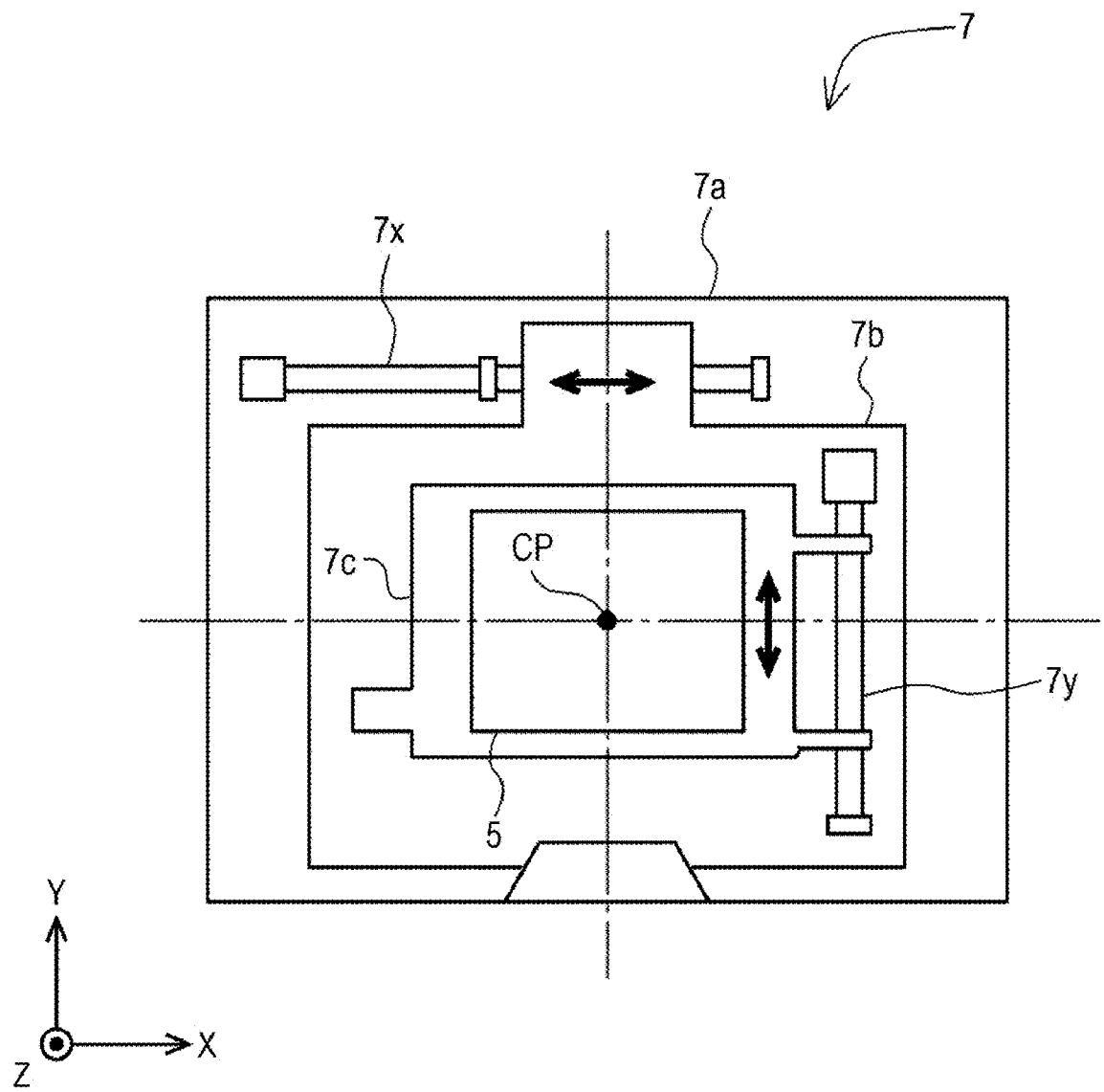
FIG. 4 is a view illustrating the schematic configuration of a shake correction mechanism.

FIG. 4 is a view illustrating the schematic configuration of the shake correction mechanism 7.

The shake correction mechanism 7 has a base portion 7a, a first movable portion 7b, and a second movable portion 7c.

The base portion 7a is fixed near a back surface portion inside the camera body unit 2. In addition, the first movable portion 7b can move in the X direction with respect to the base portion 7a, and the second movable portion 7c can move in the Y direction with respect to the first movable portion 7b. The imaging device 5 is fixed to the second movable portion 7c.

The base portion 7a has an actuator 7x. The actuator 7x is a driving mechanism called an SIDM (Smooth Impact Drive Mechanism). The SIDM is configured to include a piezoelectric element. Since the piezoelectric element repeatedly expands and contracts at a fast frequency, the actuator 7x can drive the first movable portion 7b in the X direction with respect to the base portion 7a.

In addition, the first movable portion 7b has an actuator 7y. The actuator 7y is also formed by the same SIDM as the actuator 7x. Since a piezoelectric element of the actuator 7y repeatedly expands and contracts at a fast frequency, the actuator 7y can drive the second movable portion 7c in the Y direction with respect to the first movable portion 7b.

As described above, the imaging device 5 is driven in the X direction by the actuator 7x and is driven in the Y direction by the actuator 7y. As a result, the imaging device 5 fixed to the second movable portion 7c can be relatively moved in the X and Y directions with respect to the base portion 7a by the actuators 7x and 7y.

In addition, the shake correction control section 21 drives the imaging device 5 with respect to the base portion 7a using the actuators 7x and 7y on the basis of a signal (shake detection result) detected by the angular velocity sensor 61 or the like, such that the shake in the imaging apparatus 1 is suppressed. That is, shake correction is realized.

<1-4. Shake Correction Control System>

Figure 5:
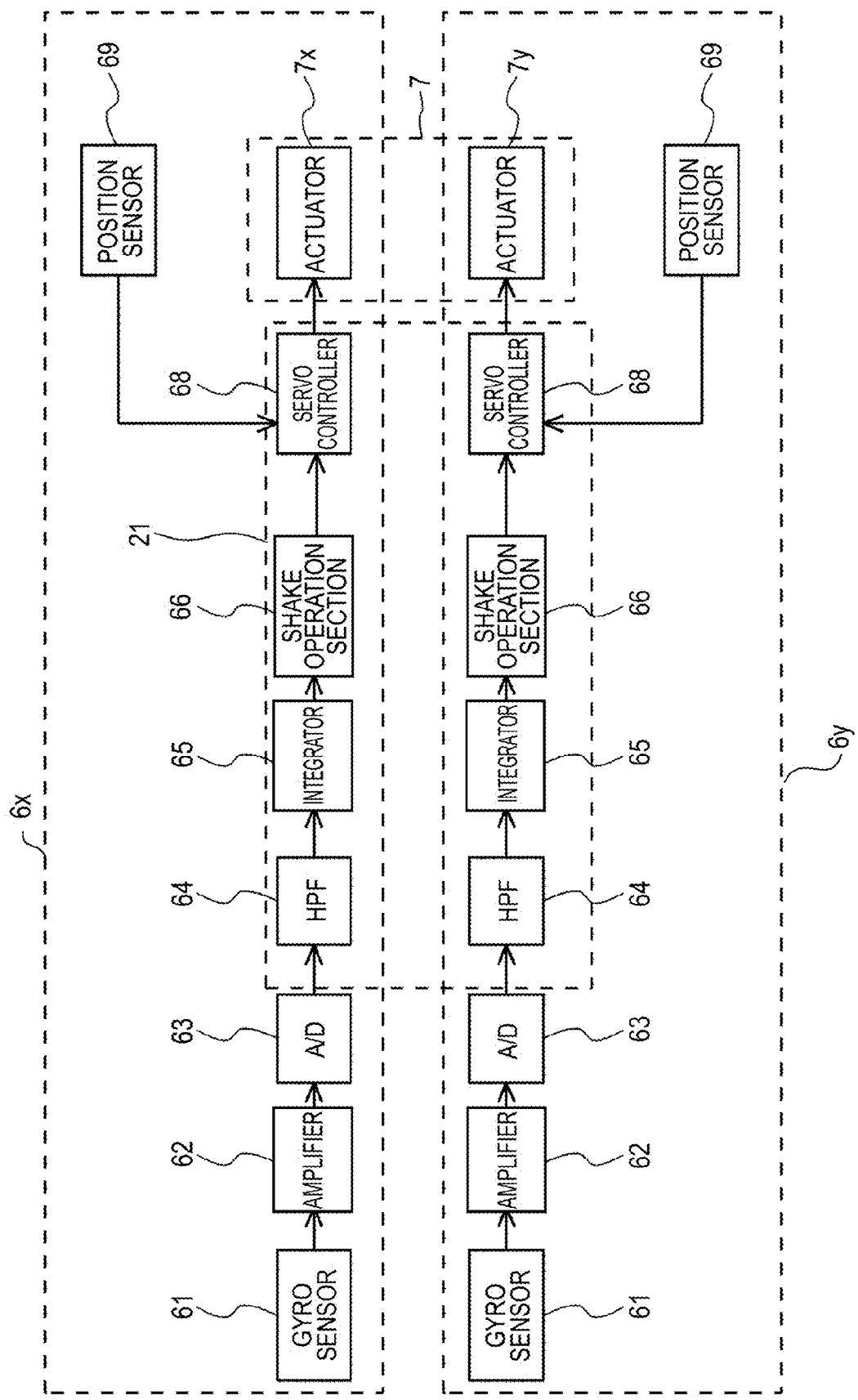
FIG. 5 is a conceptual view illustrating a control system for shake correction control.

FIG. 5 is a conceptual view illustrating a control system for shake correction control.

The imaging apparatus 1 has two control systems 6x and 6y regarding different directions. One control system 6x detects the shake in the X direction of the imaging device 5 on the basis of the angular velocity in the yaw direction of the imaging apparatus 1 and drives the imaging device 5 in the X direction so that the shake in the X direction is removed. In addition, the other control system 6y detects the shake in the Y direction of the imaging device 5 on the basis of the angular velocity in the pitch direction of the imaging apparatus 1 and drives the imaging device 5 in the Y direction so that the shake in the Y direction is removed.

Hereinafter, one control system 6x of the two control systems 6x and 6y will be described. However, the other control system 6y also has the same configuration.

The control system 6x includes the angular velocity sensor (gyro sensor) 61, an amplifier 62, an A/D converter 63, a high pass filter (HPF) 64, an integrator 65, a shake operation section 66, a servo controller 68, and the position sensor 69.

The angular velocity sensor 61 is fixed to the camera body unit 2 and outputs a signal corresponding to the angular velocity in a predetermined rotation direction (for example, yaw direction) of the camera body unit 2. That is, the angular velocity sensor 61 detects the angular velocity in the imaging apparatus 1. The output signal (detection signal) of the angular velocity sensor 61 is amplified by the amplifier 62 and is then converted into a digital signal by the A/D converter 63. The angular velocity signal converted into a digital signal passes through the HPF 64 and is then integrated by the integrator 65. As a result, a signal (data) indicating the "shake angle" is generated.

Then, the "shake angle" output from the integrator 65 is multiplied by a predetermined gain in the shake operation section 66. As a result, the "shake angle" is converted into an amount of shake VB1 on the imaging device 5.

Thus, the detection value (angular velocity) of the angular velocity sensor 61 is integrated and the amount of shake VB1 is calculated.

Then, the servo controller 68 determines the amount of driving in a predetermined direction on the basis of the amount of shake VB1 calculated by the shake operation section 66 and the position in a predetermined direction (here, the X direction) of the imaging device 5 detected by the position sensor (for example, a hall device) 69. Then, the servo controller 68 drives the shake correction mechanism 7 (actuator 7x) with a driving signal corresponding to the amount of driving. Specifically, the servo controller 68 corrects the shake of the subject image on the light receiving surface of the imaging device 5 by executing the above-described shake correction operation during the exposure period for acquisition of the actual photographing image.

In addition, the imaging apparatus 1 performs an operation (specifically, a centering operation) of returning the center position of the imaging device 5 to the reference position (here, an optical axis position CP (FIG. 4)) at a predetermined timing (here, immediately after the shake correction operation during the exposure period). Moreover, in the centering operation, the imaging device 5 is driven to the predetermined reference position on the basis of a feedback control rule using the position detection signal of the position sensor 69.

In the following explanation, an operation of the imaging apparatus 1 will be focused on the centering operation.

<1-5. Operation Outline>

Figure 6:
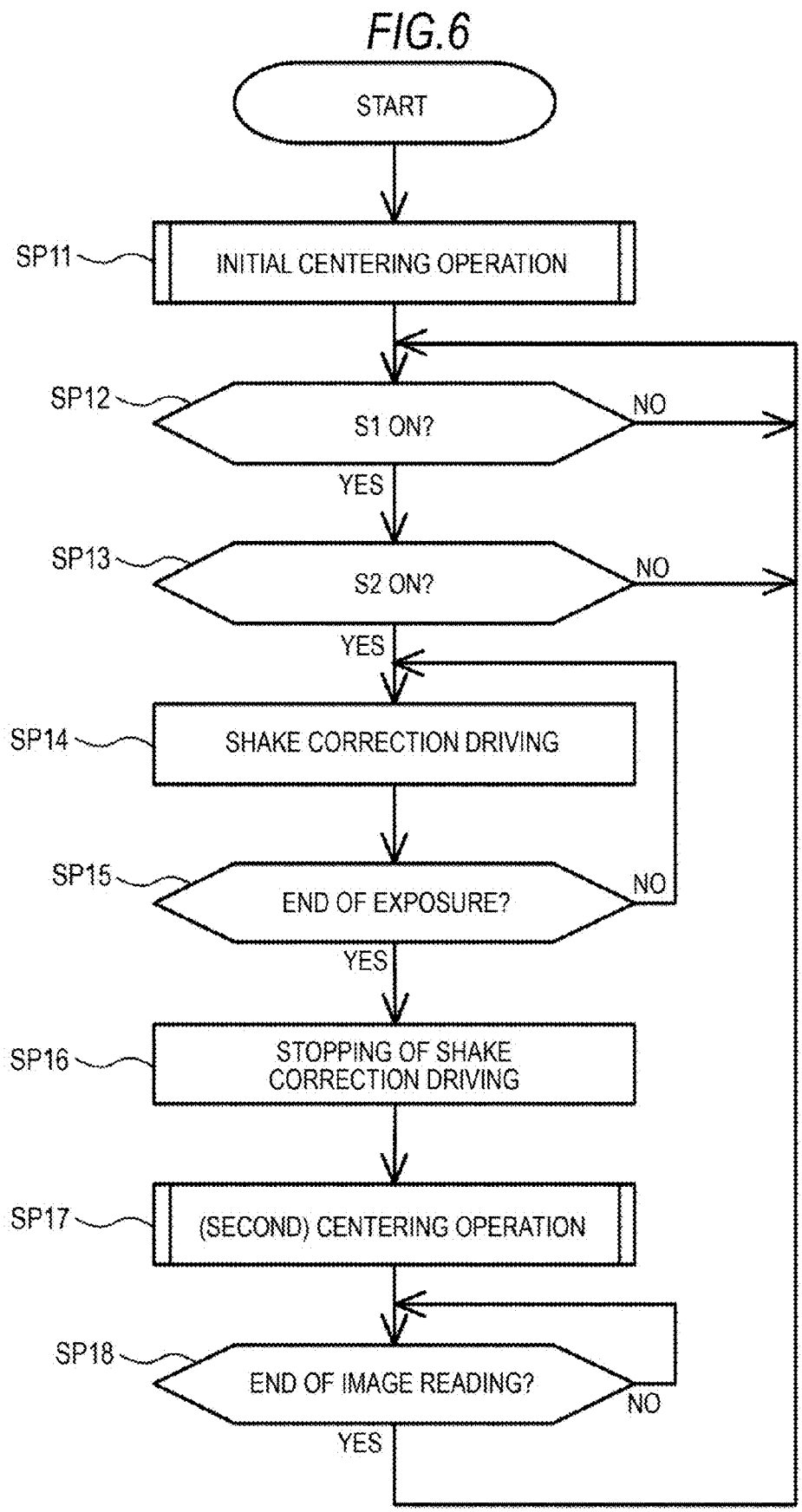
FIG. 6 is a flow chart illustrating the entire flow in a photographing operation.
Figure 7:
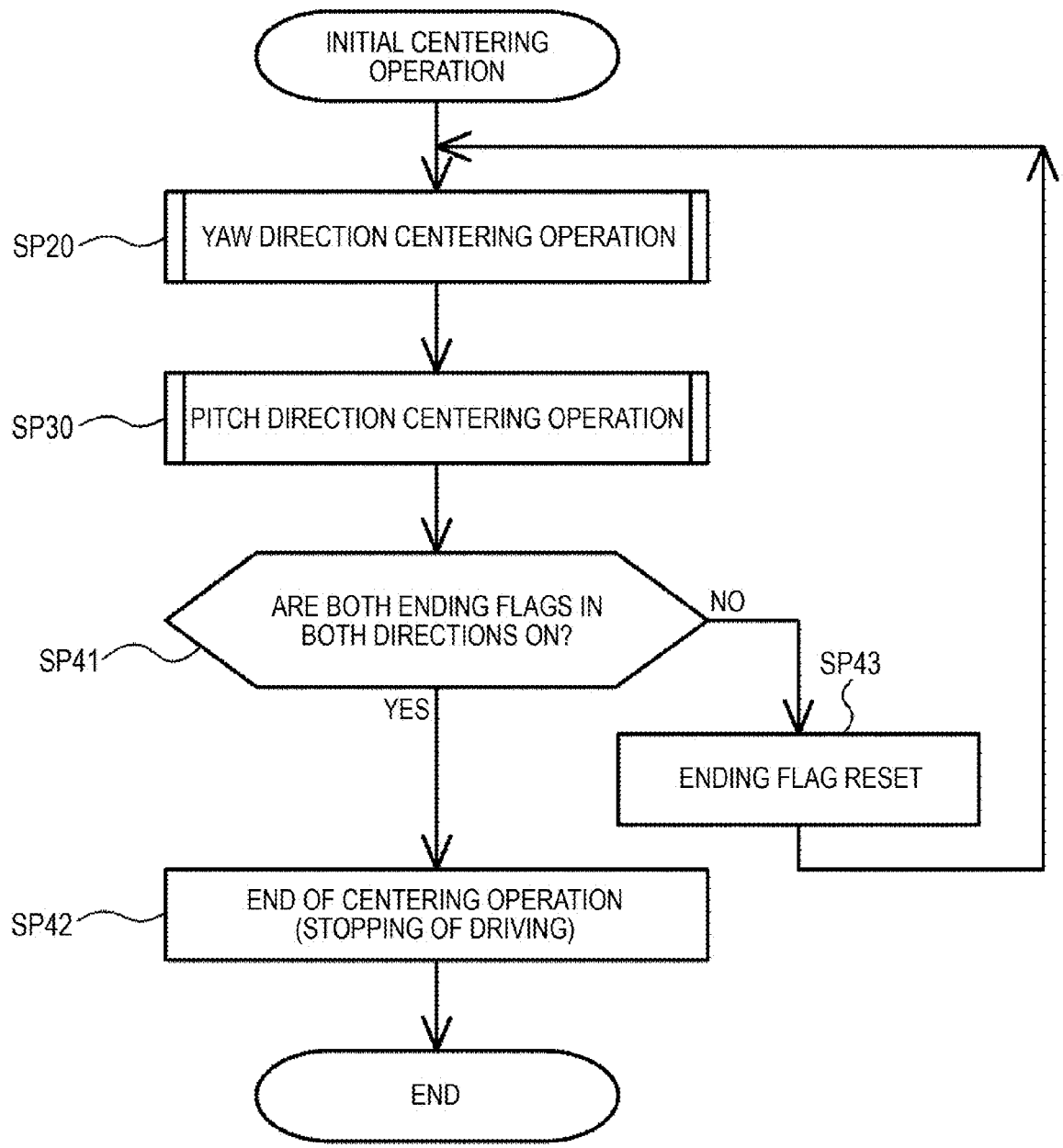
FIG. 7 is a flow chart illustrating an initial centering operation immediately after the supply of power.
Figure 8:
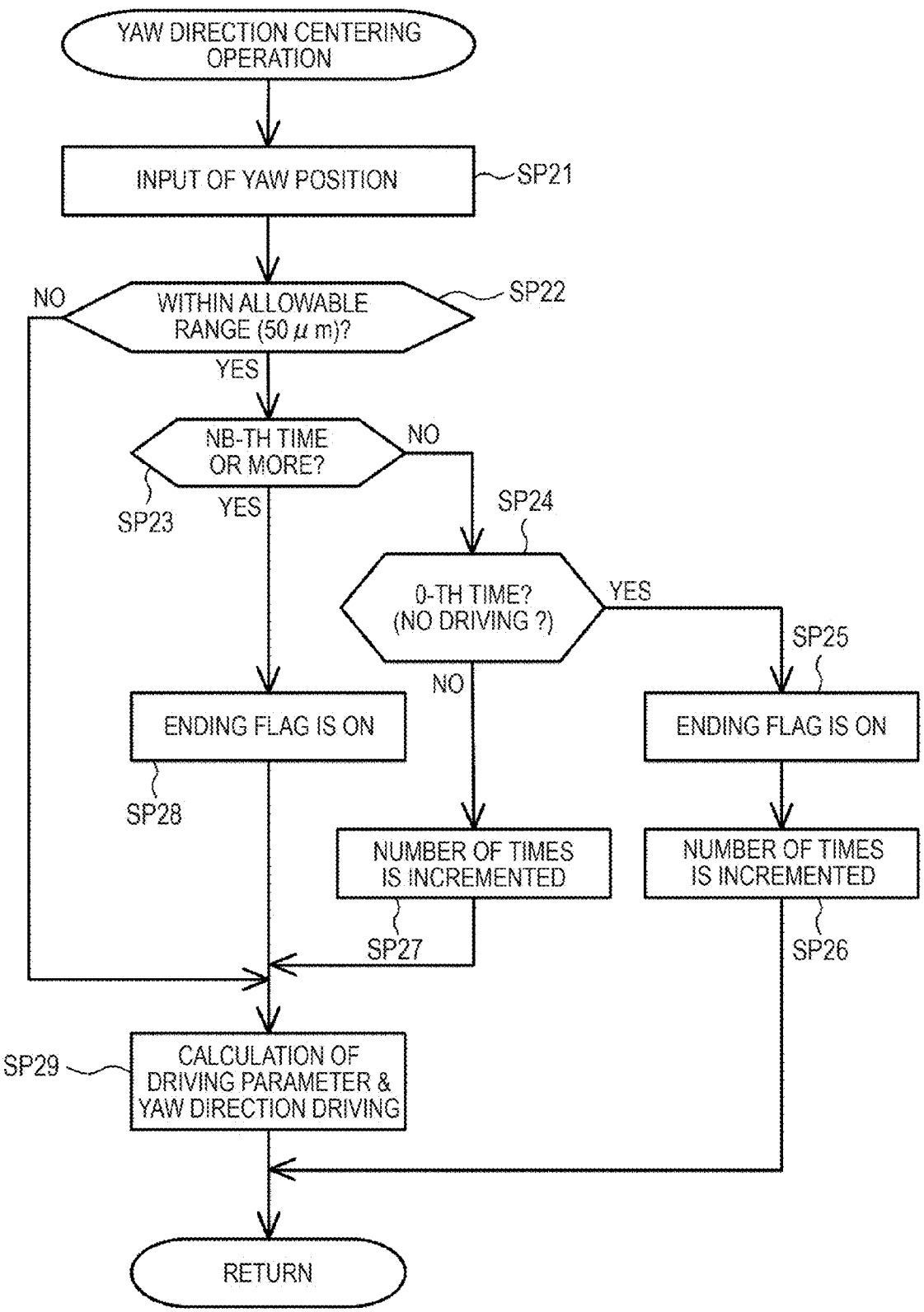
FIG. 8 is a flowchart illustrating the initial centering operation immediately after the supply of power.
Figure 9:
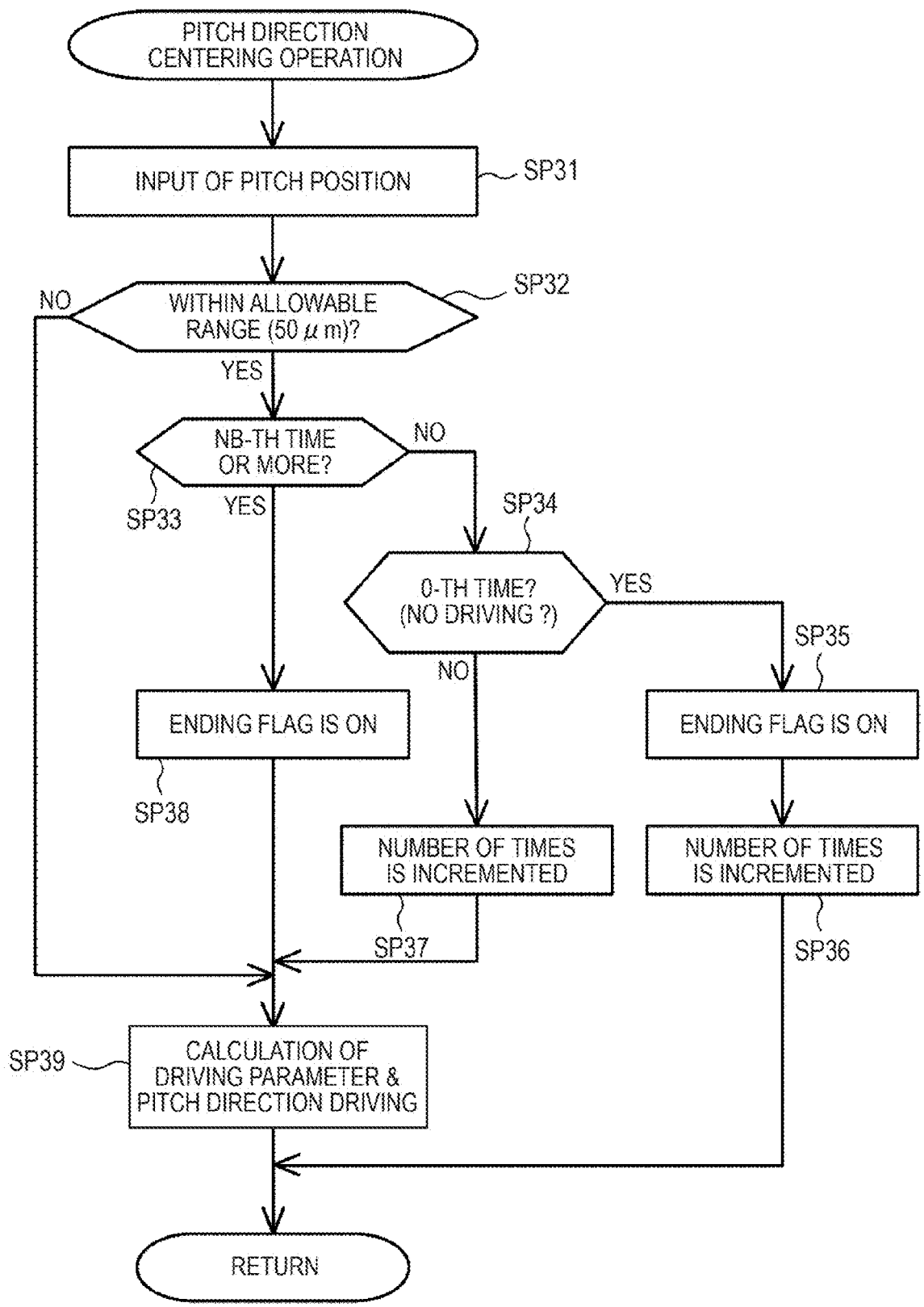
FIG. 9 is a flowchart illustrating the initial centering operation immediately after the supply of power.
Figure 10:
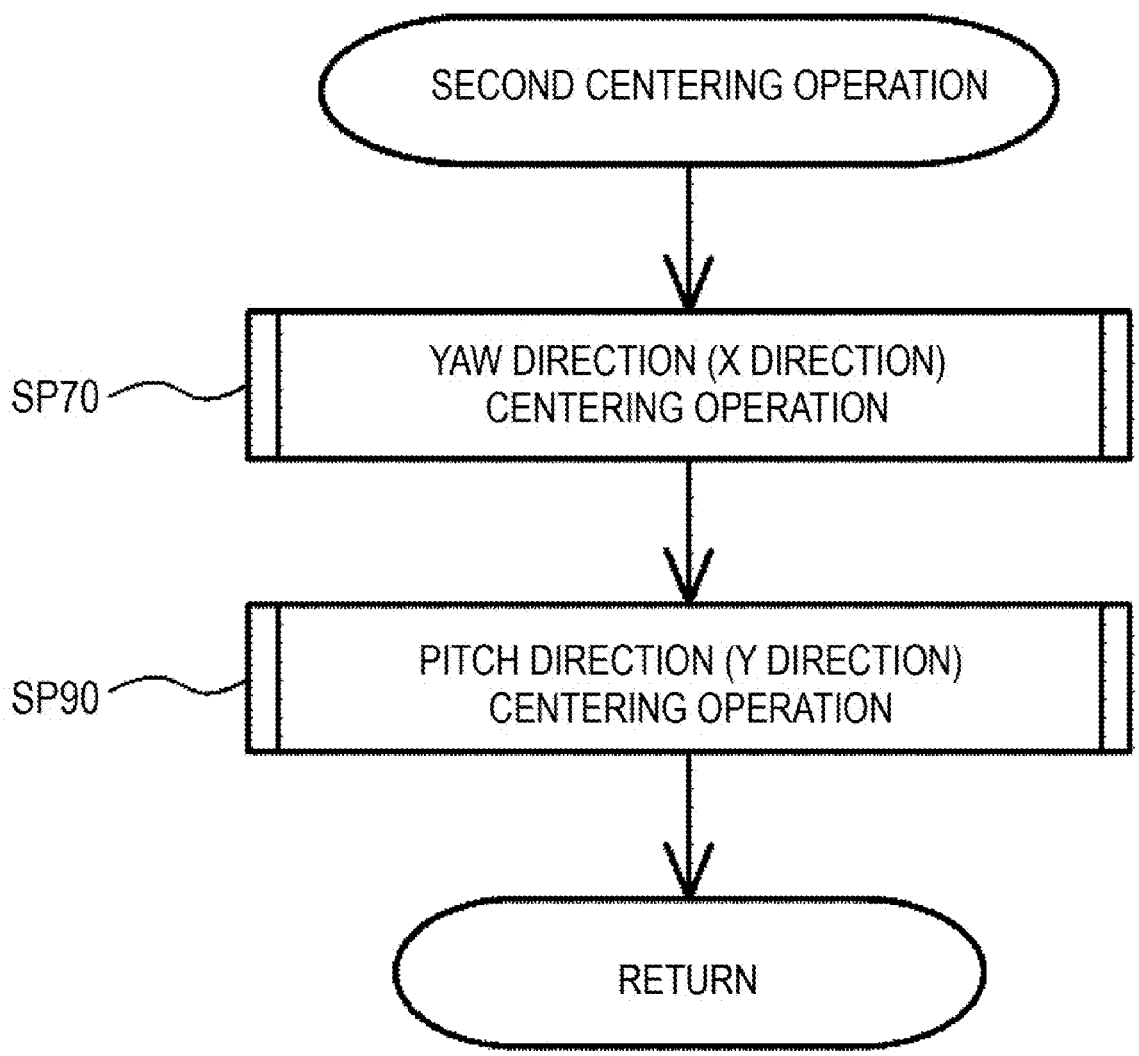
FIG. 10 is a flow chart illustrating a centering operation immediately after exposure.
Figure 11:
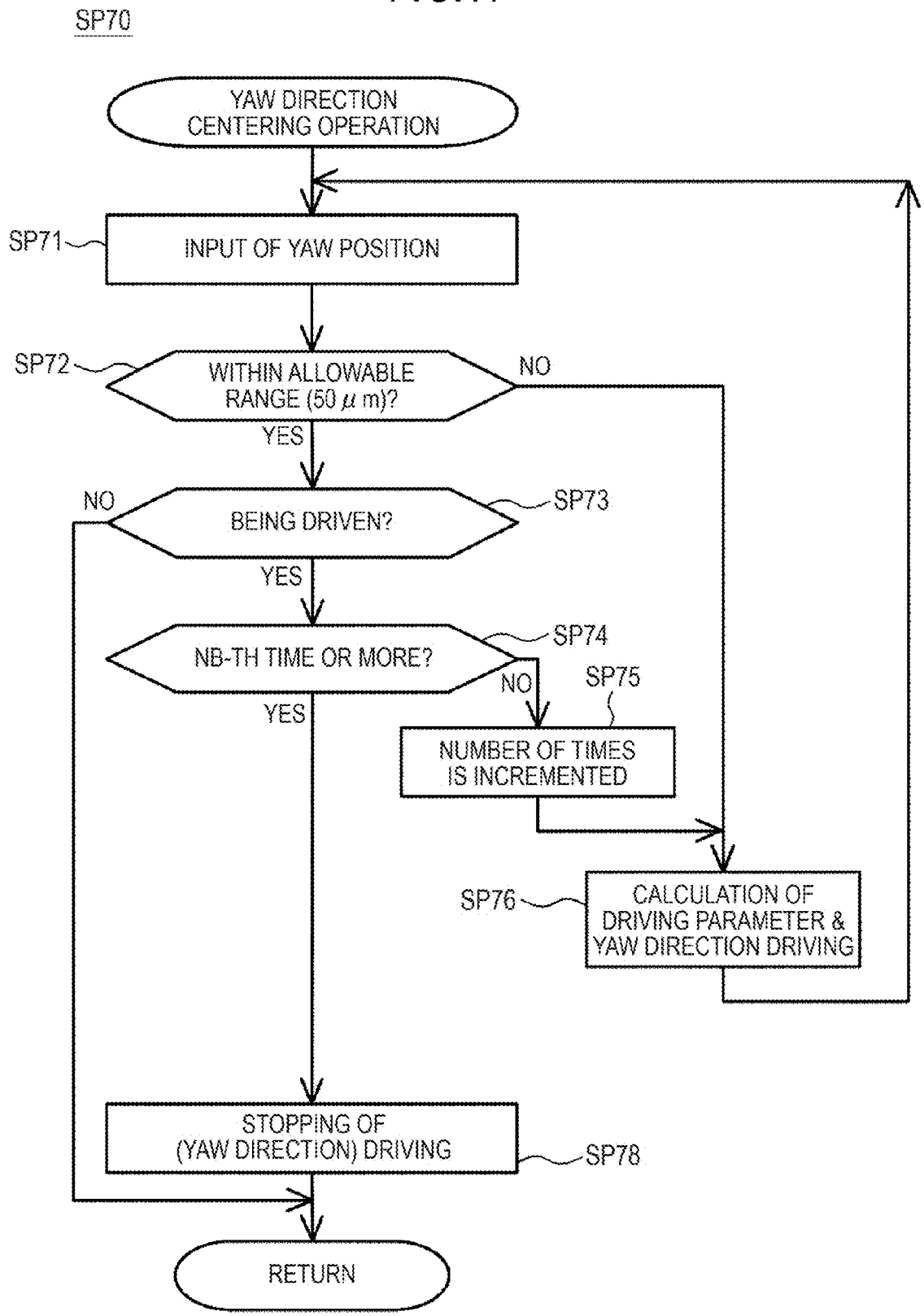
FIG. 11 is a flow chart illustrating the centering operation immediately after exposure.
Figure 12:
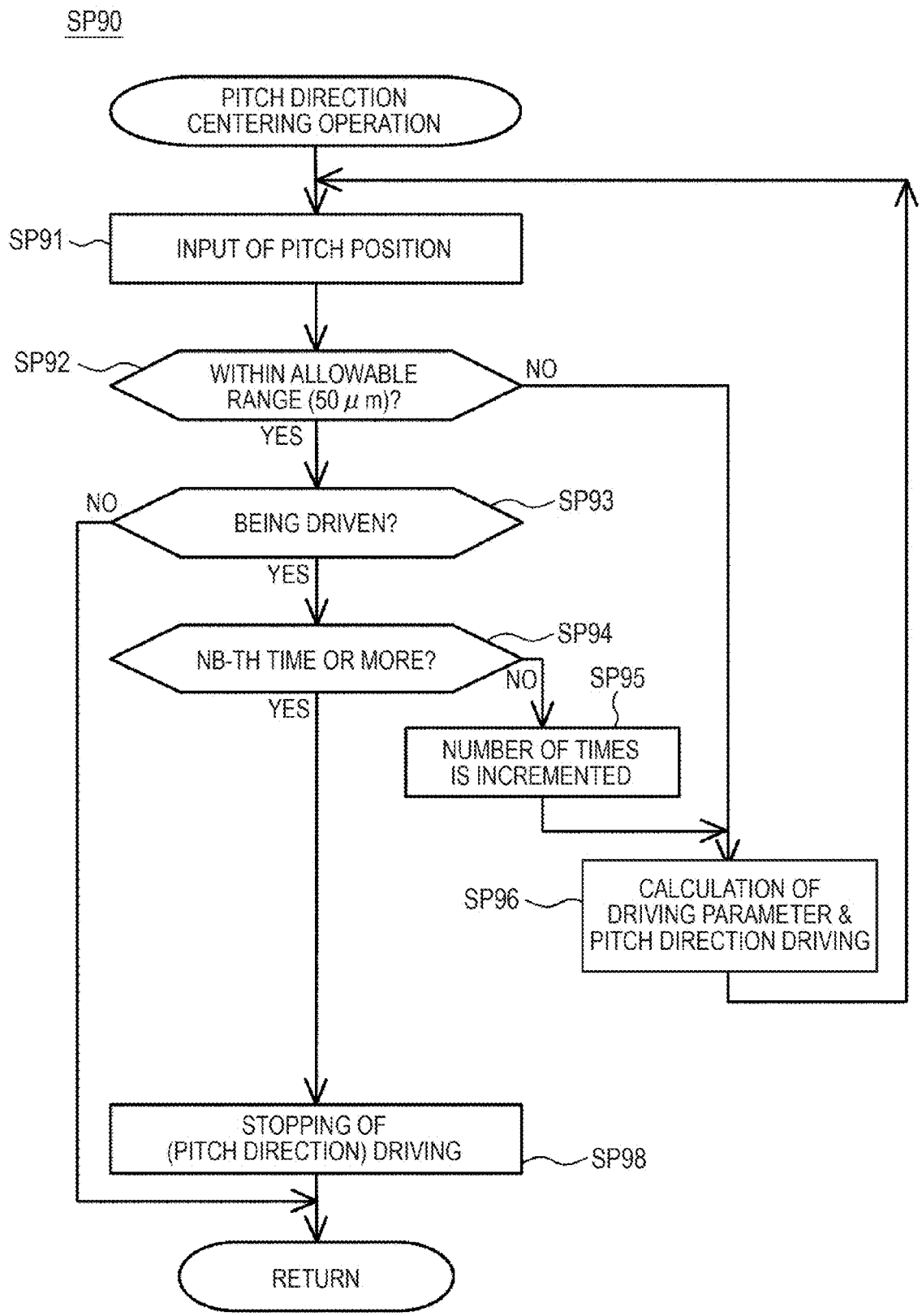
FIG. 12 is a flow chart illustrating the centering operation immediately after exposure.

Next, an operation of the imaging apparatus 1 will be described with reference to FIGS. 6 to 12. FIG. 6 is a flow chart illustrating the entire flow. In FIG. 6, two kinds of centering operations (steps SP11 and SP17) are executed. In addition, FIGS. 7 to 9 are flowcharts illustrating an initial centering operation immediately after the power is supplied (step SP11), and FIGS. 10 to 12 are flow charts illustrating a centering operation immediately after exposure (step SP17).

As shown in FIG. 6, immediately after the power is supplied, a first centering operation, specifically, an initial centering operation (step SP11) is executed.

Then, a user's operation for composition preparation or the like is performed. In addition, when the release button 11 is pressed up to the half-press state S1 so that the photographing preparation operation (for example, an AF operation) is performed and is then pressed further up to the full-press state S2, an exposure operation for actual photographing operation acquisition is performed. During the exposure period of the exposure operation for actual photographing operation acquisition, shake correction driving is executed.

Specifically, if it is determined that the release button 11 has been pressed up to the half-press state S1 in step SP12 and it is determined that the release button 11 has been pressed up to the full-press state S2 in step SP13, the process proceeds to step SP14. Then, after shake correction driving is started (step SP14), the exposure operation for actual photographing operation acquisition is started. The shake correction continues until the exposure operation ends (step SP15). In other words, if the exposure operation ends (step SP15), the shake correction driving is also be stopped (step SP16).

Then, in preparation for the next actual photographing operation, a second centering operation, specifically, a "centering operation immediately after exposure" is executed (step SP17). By the second centering operation, the imaging device 5 returns to the predetermined reference position. As a result, in the imaging device 5, it becomes possible to ensure the wide movable range again in each direction. In addition, a reading operation of the pixel data from the imaging device is executed simultaneously with the second centering operation. Then, if it is determined that the reading operation has ended (step SP18), the process returns to step SP12 to repeatedly execute the same operation.

In the present embodiment, in the first centering operation ("initial centering operation") of the two kinds of centering operations described above, the imaging apparatus 1 performs a "two axes simultaneous driving operation" of driving an imaging device simultaneously in two directions. On the other hand, in the second centering operation ("centering operation immediately after exposure"), the imaging apparatus 1 performs a "two axes sequential driving operation" of sequentially driving an imaging device in two directions. That is, the centering operation immediately after exposure is realized by executing the return processing in two directions sequentially (in other words, exclusively).

By the latter "two axes sequential driving operation", the instantaneous maximum current value in the centering operation can be reduced, compared with the former "two axes simultaneous driving operation". Accordingly, in the "centering operation immediately after exposure", total instantaneous current consumption in the centering operation is reduced and simultaneous execution of the centering operation and an operation (specifically, pixel data reading operation) other than the centering operation is easily allowed.

Figure 13:
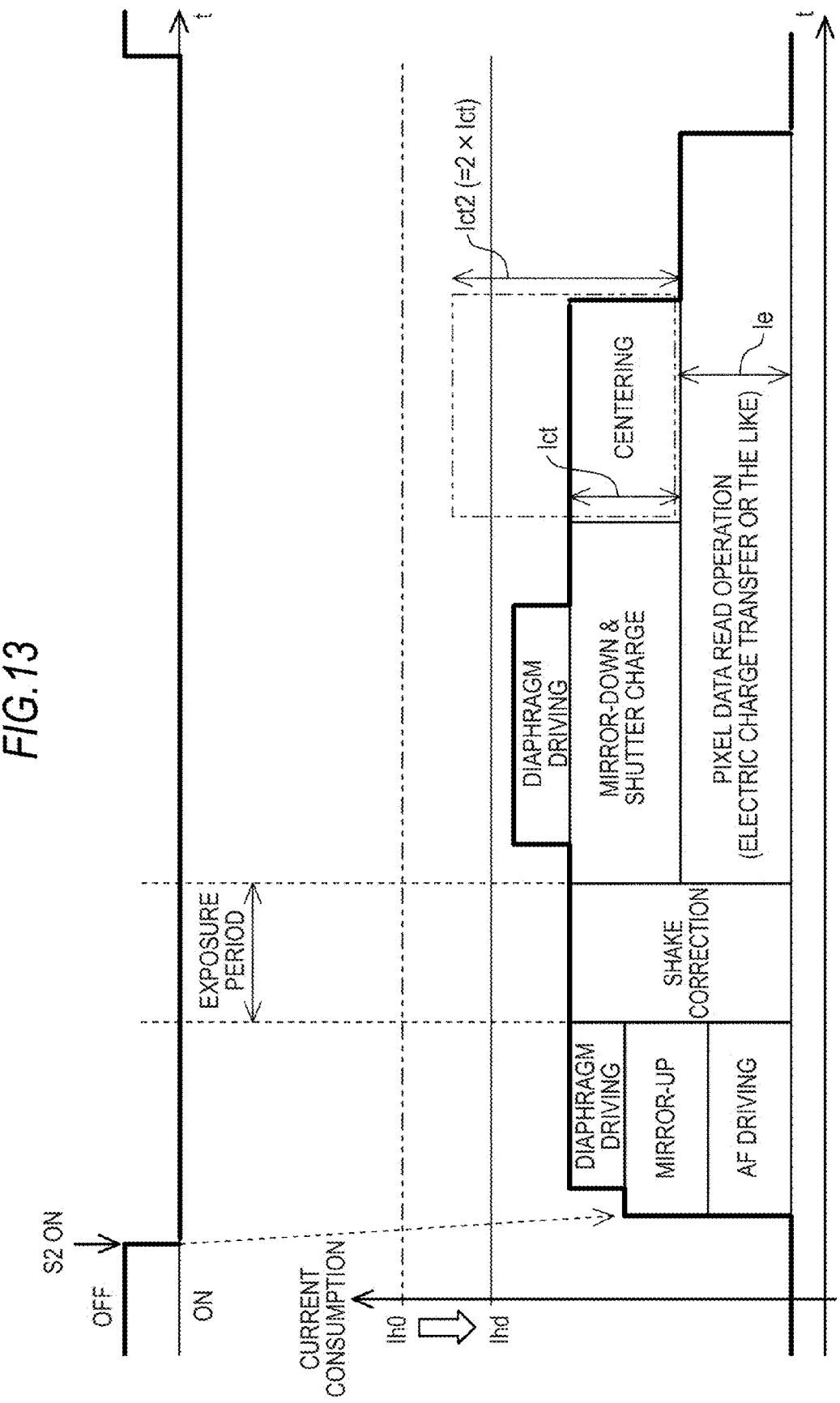
FIG. 13 is a view schematically illustrating various kinds of operations (after S2 has been set to ON)

FIG. 13 is a view schematically illustrating various kinds of operations executed when the release button 11 has been pressed up to the full-press state S2. As shown in FIG. 13, in the imaging apparatus 1, when the release button 11 is pressed up to the full-press state S2, a diaphragm driving operation, a mirror-up operation, and the like are performed. Then, the exposure operation is executed together with the shake correction operation. In addition, after the end of the exposure operation, a mirror-down operation and pixel data reading operation (operation of reading the pixel data regarding the actual photographing image from the imaging device 5 (for example, an electric charge transfer operation)) are executed simultaneously. Then, the pixel data reading operation and the centering operation ("centering operation immediately after exposure") of the imaging device 5 are executed simultaneously.

FIG. 13 shows the situation where the instantaneous maximum permissible value of the current supplied from the battery has been reduced from the value Ih0 to the value Ihd in consideration of the various conditions described above. In addition, even if the "two axes simultaneous driving operation" is performed before the reduction, the sum of the current Ict2 (=2×Ict) (two-dot chain line) necessary for the centering operation, the current Ie necessary for the pixel data reading operation, and the like does not exceed the maximum permissible value Ih0 before the reduction herein.

However, as shown in FIG. 13, when the "two axes simultaneous driving operation" is performed in the situation after the reduction, the sum of the current Ict2 necessary for the centering operation, the current Ie necessary for the pixel data reading operation, and the like may exceed the maximum permissible value Ihd after the reduction. For this reason, in this state, it is difficult to stably execute the centering operation and the pixel data reading operation due to the influence of reduction in the maximum permissible value. In addition, the centering operation may be performed after the pixel data reading operation is completed (that is, both the operations may be sequentially performed). In this case, however, a time until both the operations are completed is longer.

On the other hand, in the present embodiment, separate centering operations are sequentially executed for two axial directions. Specifically, in the centering operation immediately after exposure, first return processing in the X direction (step SP70) and second return processing in the Y direction (step SP90) are sequentially executed (refer to FIG. 10). In this case, the instantaneous maximum current value in the centering operation can be suppressed from the value Ict2 (=2×Ict) to the value Ict (refer to FIG. 13), for example. Accordingly, it becomes possible to execute the centering operation and the pixel data reading operation simultaneously (in parallel). That is, by reducing the total instantaneous current consumption in the centering operation, it becomes possible to improve the tolerance of simultaneous execution of the centering operation in the shake correction device and an operation other than the centering operation. In addition, since it is not necessary to perform the centering operation after the end of the pixel data reading operation, it can be prevented that a time until both the centering operation and the pixel data reading operation are completed is longer.

Next, the first centering operation and the second centering operation will be described in detail.

<1-6. Initial Centering Operation Immediately after Supply of Power>

First, the centering operation (initial centering operation immediately after the supply of power) will be described in detail. Moreover, in the first centering operation, the "two axes simultaneous driving operation" is performed, but the "two axes sequential driving operation" is not performed.

In the "initial centering operation", when a certain condition (also referred to as a start condition) CS1 is satisfied, simultaneous driving processing starts in two directions of yaw direction and pitch direction. In addition, when another condition (also referred to as an end condition) CE1 is satisfied, the simultaneous driving operation ends.

Here, as the start condition CS1, a condition is adopted in which at least one of the amounts of deviation ΔX and ΔY (strictly speaking, absolute values) from the reference position of the imaging device 5 in the two directions exceeds a predetermined amount Th1 (for example, 50 μm). The amount of deviation ΔX indicates the amount of deviation from the reference position of the imaging device 5 in the yaw direction (exactly, the X direction), and the amount of deviation ΔY indicates the amount of deviation from the reference position of the imaging device 5 in the pitch direction (exactly, the Y direction).

More strictly speaking, since the X direction is a translation direction and the yaw direction is a rotation direction, the X direction and the yaw direction are different. However, since a positional change in the X direction occurs on the basis of the rotary movement in the yaw direction, the yaw direction is also called the X direction herein. In addition, the same is true for the relationship between the Y direction and the pitch direction. Since a positional change in the Y direction occurs on the basis of the rotary movement in the pitch direction, the pitch direction is also called the Y direction.

In addition, as the end condition CE1, a condition is adopted in which both the amounts of deviation ΔX and ΔY (strictly speaking, absolute values) are within the predetermined amount Th1 at a sampling point of time of a predetermined number (NB+1) (for example, NB+1=3 times). By such an end condition CE1, it is possible to appropriately determine whether or not the amounts of deviation ΔX and ΔY fall within the predetermined range.

If the driving is immediately stopped on the condition that both the amounts of deviation ΔX and ΔY fall within the predetermined range at a certain point of time, the following problems may occur. That is, if the driving is immediately stopped when the imaging device 5 has passed the target position and is going to become farther from the target position (at the time of overshoot), the actual stop position of the imaging device 5 may largely deviate from the target position due to the influence of inertia or the like. Particularly when the imaging device 5 is moving relatively quickly with the relatively large driving force, such a phenomenon easily occurs. Accordingly, the position after stop exceeds a predetermined allowable range in many cases. Directly speaking, in a state where the current position of the imaging device 5 largely overshoots the target position (reference position), it is not easy to accurately stop the imaging device 5 at the target position.

On the other hand, if the end condition CE1 is adopted, it can be confirmed that the amounts of deviation ΔX and ΔY are within the predetermined range at a plurality of points of time. Accordingly, it becomes possible to stop the imaging device 5 more accurately near the target position. In other words, it becomes possible to appropriately determine whether or not the amount of deviation ΔX falls within the predetermined range.

Specifically, as shown in FIG. 7, the correction processing in the yaw direction (X direction) and the correction processing in the pitch direction (Y direction) are executed simultaneously and in parallel during a predetermined period. In more detail, the correction processing (step SP20) in the yaw direction and the correction processing (step SP30) in the pitch direction are repeatedly executed until both ending flags regarding the correction processing in both the directions are set to ON (steps SP41 and SP42). Then, when both the ending flags regarding the correction processing in both the directions are set to ON in steps SP20 and SP30, the initial centering operation is completed (steps SP41 and SP42). In addition, when at least one of the total of two ending flags regarding the correction processing in the respective directions is OFF, both of the two ending flags are reset (step SP43) and the process returns to step SP20.

Processing in step SP20 will be described in detail.

In step SP21 in FIG. 8, the yaw position (X position) is acquired and the amount of deviation ΔX between the yaw position and the reference position is calculated. Then, it is determined whether or not the amount of deviation ΔX is within the predetermined allowable range TL1 (step SP22). Specifically, if the amount of deviation ΔX is −Th1 or more and +Th1 or less, it is determined that the amount of deviation ΔX is within the allowable range TL1.

When it is determined that the amount of deviation ΔX is within the allowable range TL1, the process proceeds to step SP23. In step SP23, it is determined whether or not the number of counts CTX has reached a predetermined number NB. If the number of counts CTX has not reached the predetermined number NB, the process proceeds to step SP24.

In addition, the number of counts CTX is a parameter for counting the number of times in which the amount of deviation ΔX falls within the allowable range TL1. Here, the number of counts CTX is incremented in next steps SP26 and SP27. Accordingly, the number of counts CTX in steps SP23, SP24, and SP25 is one smaller than the total number of times in which the amount of deviation ΔX falls within the allowable range TL1 in step SP22. In other words, at each point of time of steps SP23, SP24, and SP25, the number of times determined that the amount of deviation ΔX falls within the allowable range TL1 in step SP22 is one larger than the number of counts CTX (before increment). That is, the number of times determined that the amount of deviation ΔX falls within the allowable range TL1 in step SP22 is (CTX+1) times.

In step SP24, it is determined whether or not the number of counts CTX is zero. If the number of counts CTX is zero, the value of the ending flag is set to ON (for example, "1") (step SP25) and the number of counts CTX is incremented by one (step SP26), and the process proceeds to step SP30 (step SP31 (FIG. 9)). That is, when the amount of deviation ΔX is within the allowable range TL1 in the state where driving in the yaw direction is not started, the value of the ending flag is set to ON (step SP25) and the number of counts CTX is set to 1, and then the process proceeds to step SP30.

On the other hand, when the number of counts CTX is not zero, the number of counts CTX is increment by one (step SP27) and the process proceeds to step SP29.

In addition, if the number of counts CTX has reached the predetermined number NB, the process proceeds from step SP23 to step SP28. In step SP28, the value of the ending flag is set to ON. Then, the process proceeds to step SP29.

In addition, also when it is determined that the amount of deviation ΔX does not fall within the allowable range TL1 in step SP22, the process proceeds to step SP29.

In step SP29, a driving parameter (specifically, a duty ratio in PWM control of the actuator 7x) for yaw direction driving corresponding to the amount of deviation ΔX is calculated and the driving operation in the yaw direction is executed, and then the process proceeds to step SP30 (step SP31).

Also in step SP30, the same operation as in step SP20 is executed.

Specifically, also in step SP31, the pitch position (Y position) is acquired and the amount of deviation ΔY between the pitch position and the reference position is calculated. Then, it is determined whether or not the amount of deviation ΔY is within the allowable range TL1 (step SP32). Specifically, if the amount of deviation ΔY is −Th1 or more and +Th1 or less, it is determined that the amount of deviation ΔY is within the allowable range TL1.

When it is determined that the amount of deviation ΔY is within the allowable range TL1, the process proceeds to step SP33. In step SP33, it is determined whether or not the number of counts CTY has reached the predetermined number NB. If the number of counts CTY has not reached the predetermined number NB, the process proceeds to step SP34.

In addition, the number of counts CTY is a parameter for counting the number of times in which the amount of deviation ΔY falls within the allowable range TL1. In addition, the number of counts CTY is incremented in next steps SP36 and SP37. Accordingly, the number of counts CTY in steps SP33, SP34, and SP35 is one smaller than the total number of times in which the amount of deviation ΔY falls within the allowable range TL1 in step SP32. In other words, at each point of time of steps SP33, SP34, and SP35, the number of times determined that the amount of deviation ΔY falls within the allowable range TL1 in step SP32 is one larger than the number of counts CTY (before increment). That is, the number of times determined that the amount of deviation ΔY falls within the allowable range TL1 in step SP32 is (CTY+1) times.

In step SP34, it is determined whether or not the number of counts CTY is zero. If the number of counts CTY is zero, the value of the ending flag is set to ON (for example, "1") (step SP35) and the number of counts CTY is incremented by one (step SP36), and the process proceeds to step SP41 (FIG. 7). That is, when the amount of deviation ΔY is within the allowable range TL1 in the state where driving in the pitch direction is not started, the value of the ending flag is set to ON (step SP35) and the number of counts CTY is set to 1, and then the process proceeds to step SP41.

On the other hand, when the number of counts CTY is not zero, the number of counts CTY is increment by one (step SP37) and the process proceeds to step SP39.

In addition, if the number of counts CTY has reached the predetermined number NB, the process proceeds from step SP33 to step SP38. In step SP38, the value of the ending flag is set to ON. Then, the process proceeds to step SP39.

In addition, also when it is determined that the amount of deviation ΔY does not fall within the allowable range TL1 in step SP32, the process proceeds to step SP39.

In step SP39, a driving parameter (specifically, a duty ratio in PWM control of the actuator 7y) for pitch direction driving corresponding to the amount of deviation ΔY is calculated and the driving operation in the pitch direction is executed, and then the process proceeds to step SP41 (FIG. 7).

In step SP41, it is determined whether or not both the ending flags in both the directions are ON. When at least one of the ending flags in both the directions is not ON (is OFF), the process returns to step SP20 to repeat the above-described operation. On the other hand, when both the ending flags in both the directions are ON, the process proceeds to step SP42. In step SP42, the initial centering operation ends. Specifically, when the actual driving operation starts, the driving operation in both the directions is stopped. In addition, when the actual driving operation is not started, the initial centering operation ends without executing the actual driving.

For example, when both the amounts of deviation ΔX and ΔY in both the directions are within the allowable range TL1 in the state where no driving operation in both the directions is started, the values of both the ending flags in both the directions are set to ON (steps SP25 and SP35) and the process proceeds to step SP41. Then, the process proceeds from step SP41 to step SP42 and the centering operation ends. In this case, since no driving operation in both the directions is started in steps SP20 and SP30, the initial centering operation ends without starting the actual driving operation.

In addition, when at least one of the amounts of deviation ΔX and ΔY in both the directions exceeds the allowable range TL1 in the state where no driving operation in both the directions is started, the driving operations in both the directions are started. For example, when the amount of deviation ΔX in the yaw direction does not exceed the allowable range TL1 but the amount of deviation ΔY in the pitch direction exceeds the allowable range TL1, the process proceeds from step SP21 to step SP39 through steps SP22 to SP26, SP31, and SP32. Then, in step SP39, driving in the pitch direction is first started. Moreover, in step SP26, the number of counts CTX is incremented to "1". Then, the process returns to step SP20 from step SP41 through step SP43. In step SP20 in the second time, the process proceeds from step SP21 to step SP29 through steps SP22 to SP24 and SP27. In step SP29, driving in the yaw direction is also started. Moreover, in step SP26, the number of counts CTX is incremented to "2". In step SP30 in the second time, the process proceeds from step SP31 to step SP39 through step SP32. In step SP39, driving in the pitch direction is continued. In this way, driving in both the directions is started and the coaxial driving operation in both the directions is executed.

In addition, once the driving operation is started, the simultaneous driving operations in both the directions end when the end condition CE1 is satisfied.

For example, if it is determined that the amount of deviation ΔX is within the predetermined value Th1 NB times in total, the process proceeds to step SP28 through steps SP21 to SP23 and the ending flag is set to ON, in processing of step SP20 in subsequent times (for example, (NB+1)-th time). Similarly, if it is determined that the amount of deviation ΔY is within the predetermined value Th1 NB times in total, the process proceeds to step SP38 through steps SP31 to SP33 and the ending flag is set to ON, in processing of step SP30 in subsequent times. Then, in step SP41, if it is confirmed that both the ending flag in the yaw direction and the ending flag in the pitch direction are ON, the centering driving is stopped.

<1-7. Centering Operation Immediately after Exposure>

Next, the second centering operation ("centering operation immediately after exposure") will be described in detail with reference to FIGS. 10 to 12.

In the "centering operation immediately after exposure", the return processing (correction operation) in the yaw direction and the return processing (correction operation) in the pitch direction are executed sequentially (in order) as described above (refer to FIG. 10).

More specifically, when the start condition CS21 regarding the driving operation in the yaw direction is satisfied, the driving operation in the yaw direction is started. In addition, when the end condition CE21 is satisfied, the driving operation in the yaw direction ends. Here, as the start condition CS21, a condition is adopted in which the amount of deviation ΔX (strictly speaking, the absolute value) from the reference position of the imaging device 5 in the yaw direction exceeds the predetermined amount Th1 (for example, 50 μm). In addition, as the end condition CE21, a condition is adopted in which the amount of deviation ΔX (strictly speaking, the absolute value) is within the predetermined amount Th1 at a sampling point of time of a predetermined number (NB+1) (for example, NB+1=3 times). By such an end condition CE21, it is possible to appropriately determine whether or not the amount of deviation ΔX falls within the predetermined range.

In addition, when it is determined that the amount of deviation ΔX is already within the predetermined range in the state where driving in the yaw direction has not been performed, the imaging apparatus 1 ends the return processing (correction operation) in the yaw direction without starting the driving operation in the yaw direction.

Moreover, similarly, the driving operation in the pitch direction is started when the start condition CS22 regarding the driving operation in the pitch direction is satisfied, and the driving operation in the pitch direction is ended when the end condition CE22 is satisfied. Here, as the start condition CS22, a condition is adopted in which the amount of deviation ΔY (strictly speaking, the absolute value) from the reference position of the imaging device 5 in the pitch direction exceeds the predetermined amount Th1 (for example, 50 μm). In addition, as the end condition CE22, a condition is adopted in which the amount of deviation ΔY (strictly speaking, the absolute value) is within the predetermined amount Th1 at a sampling point of time of a predetermined number (NB+1) (for example, NB+1=3 times). By such an end condition CE22, it is possible to appropriately determine whether or not the amount of deviation ΔY falls within the predetermined range.

In addition, when it is determined that the amount of deviation ΔY is already within the predetermined range in the state where driving in the pitch direction has not been performed, the imaging apparatus 1 ends the return processing (correction operation) in the pitch direction without starting the driving operation in the pitch direction.

First, the return processing (step SP70) in the yaw direction will be described with reference to FIG. 11.

In step SP71, the yaw position (X position) of the imaging device 5 is acquired and the amount of deviation ΔX between the yaw position and the reference position is calculated. Then, it is determined whether or not the amount of deviation ΔX is within the allowable range TL1 (step SP72). Specifically, if the amount of deviation ΔX is −Th1 or more and +Th1 or less, it is determined that the amount of deviation ΔX is within the allowable range TL1.

When it is determined that the amount of deviation ΔX exceeds the allowable range TL1, the process proceeds to step SP76. In step SP76, a driving parameter (specifically, a duty ratio in PWM control of the actuator 7x) for yaw direction driving corresponding to the amount of deviation ΔX is calculated and the driving operation in the yaw direction is executed, and then the process proceeds to step SP71.

On the other hand, when it is determined that the amount of deviation ΔX is within the allowable range TL1, the process proceeds to step SP73. In step SP73, it is determined whether or not the driving operation in the yaw direction has already started.

When the driving operation in the yaw direction has not started yet, the processing in step SP70 ends. That is, when it is determined that the amount of deviation ΔX is already within the allowable range TL1 in the state where driving in the yaw direction has not been performed, the imaging apparatus 1 ends the return processing (correction operation) in the yaw direction without starting the driving operation in the yaw direction.

When the driving operation in the yaw direction has already started, the process proceeds from step SP73 to step SP74. In step SP74, it is determined whether or not the number of counts CTX has reached the predetermined number NB.

If the number of counts CTX has not reached the predetermined number NB, the process proceeds from step SP74 to step SP75. In step SP75, the number of counts CTX is incremented by one, and the process proceeds to step SP76. In step SP76, the driving parameter for yaw direction driving is calculated and the driving operation in the yaw direction is executed, and then the process returns to step SP71.

If the number of counts CTX has reached the predetermined number NB, the process proceeds from step SP74 to step SP78. In step SP78, the driving operation in the yaw direction is stopped.

Thus, when the amount of deviation ΔX is within the allowable range TL1 in the state where driving in the yaw direction is not started, the imaging apparatus 1 ends the correction operation in the yaw direction without executing the driving operation in the yaw direction. In addition, when the amount of deviation ΔX exceeds the allowable range TL1, the imaging apparatus 1 starts the driving operation in the yaw direction. In addition, after confirming a predetermined number of times ((NB+1) times) that the amount of deviation ΔX exists within the allowable range TL1, the imaging apparatus 1 ends the driving operation in the yaw direction.

In other words, when the amount of deviation ΔX of the imaging device 5 falls within the allowable range TL1 at the start of the first return processing (step SP70), the imaging apparatus 1 ends the first return processing without starting the driving operation of the actuator 7x. In addition, when the amount of deviation ΔX of the imaging device 5 exceeds the allowable range TL1 at the start of the first return processing (step SP70), the imaging apparatus 1 starts the driving operation of the actuator 7x. Then, after the driving operation of the actuator 7x has started in the first return processing, the imaging apparatus 1 stops the driving operation of the actuator 7x if it is determined at a plurality of points in time where the amount of deviation ΔX of the imaging device 5 falls within the allowable range TL1.

Next, the return processing (step SP90) in the pitch direction will be described with reference to FIG. 12. The return processing in the pitch direction is the same as the return processing in the yaw direction except that the directions are different.

Specifically, in step SP91, the pitch position (Y position) of the imaging device 5 is acquired and the amount of deviation ΔY between the pitch position and the reference position is calculated. Then, it is determined whether or not the amount of deviation ΔY is within the allowable range TL1 (step SP92). Specifically, if the amount of deviation ΔY is −Th1 or more and +Th1 or less, it is determined that the amount of deviation ΔY is within the allowable range TL1.

When it is determined that the amount of deviation ΔY exceeds the allowable range TL1, the process proceeds to step SP96. In step SP96, a driving parameter (specifically, a duty ratio in PWM control of the actuator 7y) for pitch direction driving corresponding to the amount of deviation ΔY is calculated and the driving operation in the pitch direction is executed, and then the process proceeds to step SP91.

On the other hand, when it is determined that the amount of deviation ΔY is within the allowable range TL1, the process proceeds to step SP93. In step SP93, it is determined whether or not the driving operation in the pitch direction has already started.

When the driving operation in the pitch direction has not started yet, the processing in step SP90 ends. That is, when it is determined that the amount of deviation ΔY is already within the allowable range TL1 in the state where driving in the pitch direction has not been performed, the imaging apparatus 1 ends the return processing (correction operation) in the pitch direction without starting the driving operation in the pitch direction.

When the driving operation in the pitch direction has already started, the process proceeds from step SP93 to step SP94. In step SP94, it is determined whether or not the number of counts CTY has reached the predetermined number NB.

If the number of counts CTY has not reached the predetermined number NB, the process proceeds from step SP94 to step SP95. In step SP95, the number of counts CTY is incremented by one, and the process proceeds to step SP96. In step SP96, the driving parameter for pitch direction driving is calculated and the driving operation in the pitch direction is executed, and then the process returns to step SP91.

If the number of counts CTY has reached the predetermined number NB, the process proceeds from step SP94 to step SP98. In step SP98, the driving operation in the pitch direction is stopped.

Thus, when the amount of deviation ΔY is within the allowable range TL1 in the state where driving in the pitch direction is not started, the imaging apparatus 1 ends the correction operation in the pitch direction without executing the driving operation in the pitch direction. In addition, when the amount of deviation ΔY exceeds the allowable range TL1, the imaging apparatus 1 starts the driving operation in the pitch direction. In addition, after confirming a predetermined number of times ((NB+1) times) that the amount of deviation ΔY exists within the allowable range TL1, the imaging apparatus 1 ends the driving operation in the pitch direction.

In other words, when the amount of deviation ΔY of the imaging device 5 falls within the allowable range TL1 at the start of the second return processing (step SP90), the imaging apparatus 1 ends the second return processing without starting the driving operation of the actuator 7y. In addition, when the amount of deviation ΔY of the imaging device 5 exceeds the allowable range TL1 at the start of the second return processing (step SP90), the imaging apparatus 1 starts the driving operation of the actuator 7y. Then, after the driving operation of the actuator 7y has started in the second return processing, the imaging apparatus 1 stops the driving operation of the actuator 7y if it is determined at a plurality of points in time where the amount of deviation ΔY of the imaging device 5 falls within the allowable range TL1.

In this way, the "centering operation immediately after exposure" is executed.

2. Second Embodiment

In the first embodiment, the case was illustrated in which two return processings (first return processing and second return processing) in different directions were sequentially executed in the centering operation immediately after exposure. In the second embodiment, the case will be illustrated in which three return processings are sequentially executed. Specifically, the case will be illustrated in which not only the above-described two return processings are executed but also preliminary return processing is executed before the two return processings. In this case, it is possible to reduce an error caused by deviation (refer to FIG. 14) between the axial direction in sensing and the actual driving direction, which will be described later.

Figure 15:
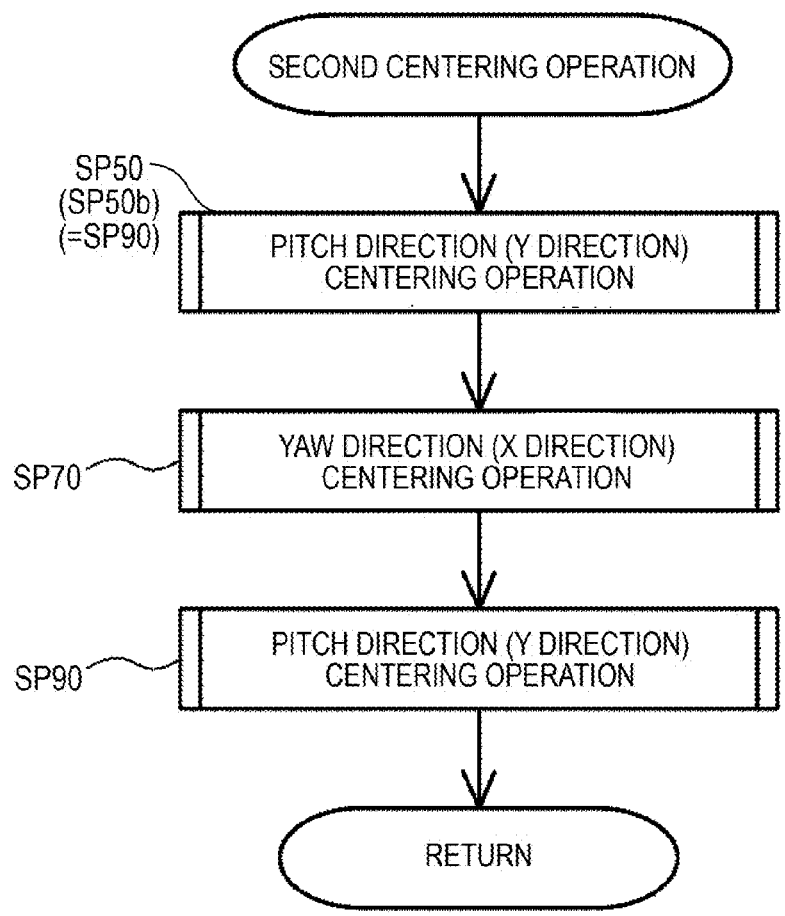
FIG. 15 is a flow chart illustrating a centering operation in a second embodiment.

FIG. 15 is a view illustrating the "centering operation immediately after exposure" in the second embodiment. As shown in FIG. 15, in the second embodiment, return processing (step SP70) in the yaw direction (X direction) and return processing (step SP90) in the pitch direction (Y direction) are executed in the same manner as in the first embodiment. However, in the second embodiment, return processing (step SP50b) in the pitch direction is further executed before the return processing (step SP70) in the yaw direction. In this point, the second embodiment is different from the first embodiment. In the second embodiment, the preliminary return processing (step SP50b) in the Y direction using the actuator 7y, the first return processing (step SP70) in the X direction, and the second return processing (step SP90) in the Y direction are executed in this order.

Moreover, in the second embodiment, the return processing in the pitch direction executed in step SP50 is completely the same as the return processing in the pitch direction executed in step SP90.

Figure 14:
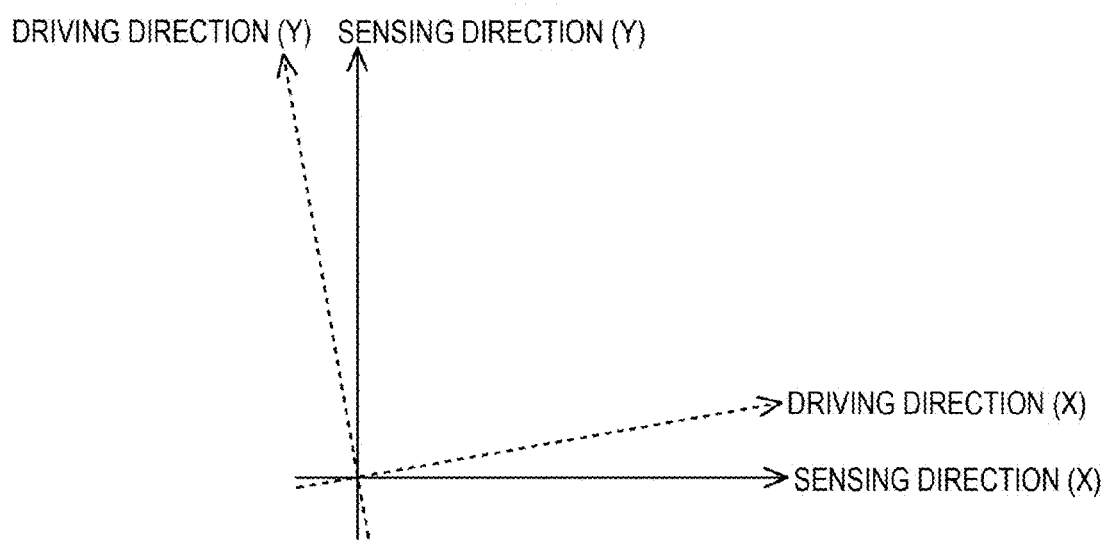
FIG. 14 is a view illustrating deviation between the detection direction of a position sensor and the driving direction of an actuator.

FIG. 14 is a view illustrating the deviation between the position detection direction of a position sensor (for example, a hall device) 69 and the driving direction of an actuator. When the shake correction mechanism 7 is actually assembled, the position detection direction (sensing direction) of the position sensor (for example, a hall device) 69 and the driving direction of the actuator may deviate from each other due to dimensional variations of components and the like. In addition, since such deviation is deviation between the sensing axis and the driving axis, it is also called "axial deviation".

When such "axial deviation" exists, even if the imaging device 5 is driven only in the X direction by the actuator 7x, small movement in the Y direction is detected by the position sensor 69. Similarly, even if the imaging device 5 is driven only in the Y direction by the actuator 7y, small movement in the X direction is detected by the position sensor 69. That is, even if the imaging device 5 is driven in only one direction of the two perpendicular axial directions, the imaging device 5 also moves in the other direction.

However, if the two axes simultaneous driving operation, such as the initial centering operation (step SP11), is executed, movement in the other axial direction (Y direction) also occurs with driving in one axial direction (for example, X direction), but driving in the other axial direction is also performed simultaneously. Accordingly, the error caused by the movement in the other axial direction is also reduced. The same is true for the opposite case. That is, since the driving in the one axial direction is also performed simultaneously even if the movement in the one axial direction (X direction) occurs with the driving in the other axial direction (for example, Y direction), the error caused by the movement in the one axial direction is reduced. Thus, in the two axes simultaneous driving operation, the position of the imaging device 5 is gradually converged to the predetermined reference position by feedback control. Accordingly, the influence of the deviation is relatively small.

However, in the "two axes sequential driving operation", the imaging device 5 is driven in the first direction (for example, X direction) in the first return processing and is then driven in the second direction (for example, Y direction) in the second return processing. In this case, when the imaging device 5 is driven in the second direction in the second return processing, movement in the first direction (for example, X direction) also occurs. For this reason, there is a high possibility that there will be an error in the first direction (for example, X direction) after the second return processing. Particularly when the amount of movement in the second direction is large, the remaining error in the first direction after the second return processing is relatively large.

Therefore, in the second embodiment, preliminary return processing is first executed before the first return processing. This preliminary return processing is return processing in the second direction. That is, the amount of deviation from the reference position in the second direction is reduced by the preliminary return processing. Thereafter, the first return processing in the first direction and the second return processing in the second direction are performed. Accordingly, since the amount of deviation in the second direction is reduced by the preliminary return processing, the amount of movement in the second direction at the time of second return processing is reduced. As a result, the remaining error in the first direction after the second return processing can be reduced.

FIGS. 16 to 19 are views illustrating the centering operation in the second embodiment. In FIGS. 16 to 19, the center position of the imaging device 5 is shown as a black point. In addition, it is assumed that the center position of the imaging device 5 immediately after exposure is a position PG0 in FIG. 16.

Figure 16:
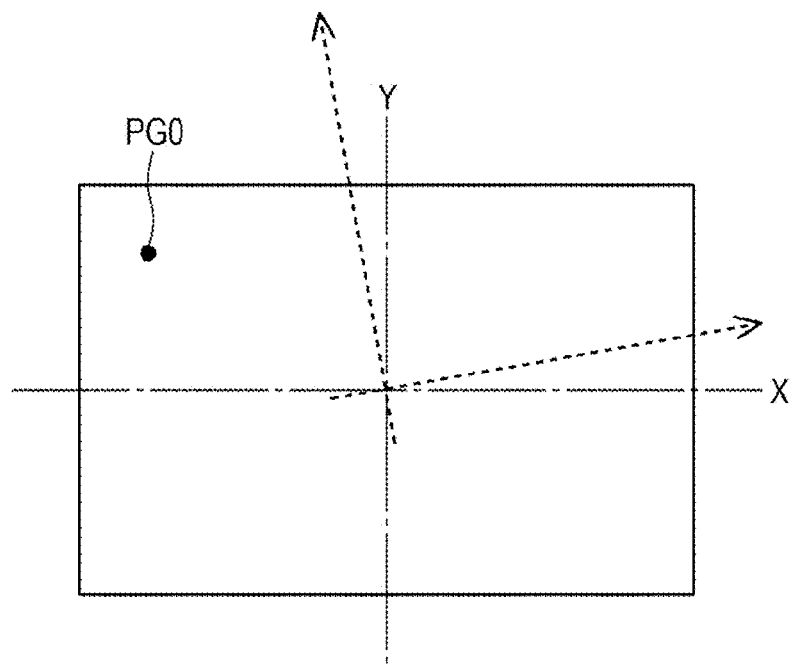
FIG. 16 is a view illustrating the centering operation in the second embodiment.
Figure 17:
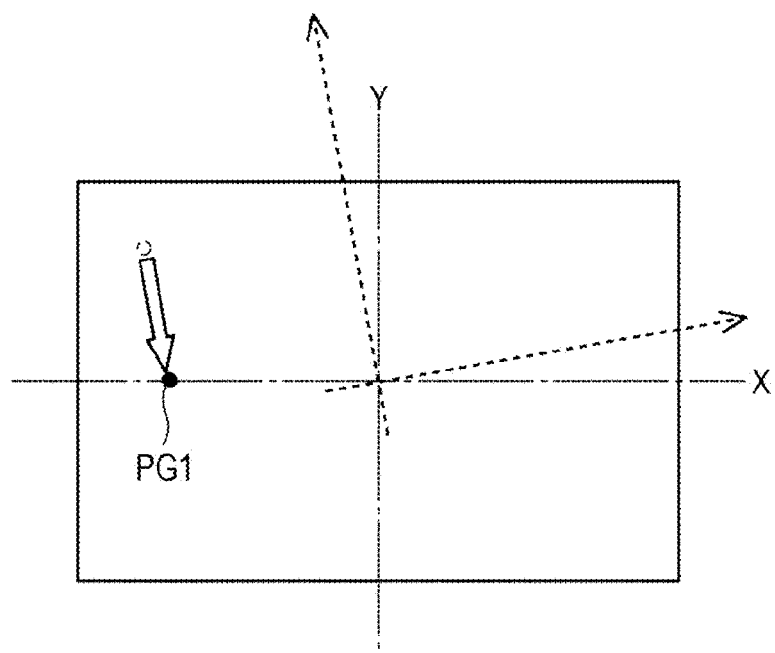
FIG. 17 is a view illustrating the centering operation in the second embodiment.

First, as shown in FIG. 17, the center position of the imaging device 5 moves from the position PG0 in FIG. 16 to the position PG1 in FIG. 17 by the preliminary return processing in the second direction (Y direction). Accordingly, the amount of deviation ΔY in the Y direction falls within the allowable range TL1. In addition, FIG. 17 shows a state where the center position of the imaging device 5 moves onto the X axis (sensing axis) and the amount of deviation in the Y direction is ideally corrected to zero.

Figure 18:
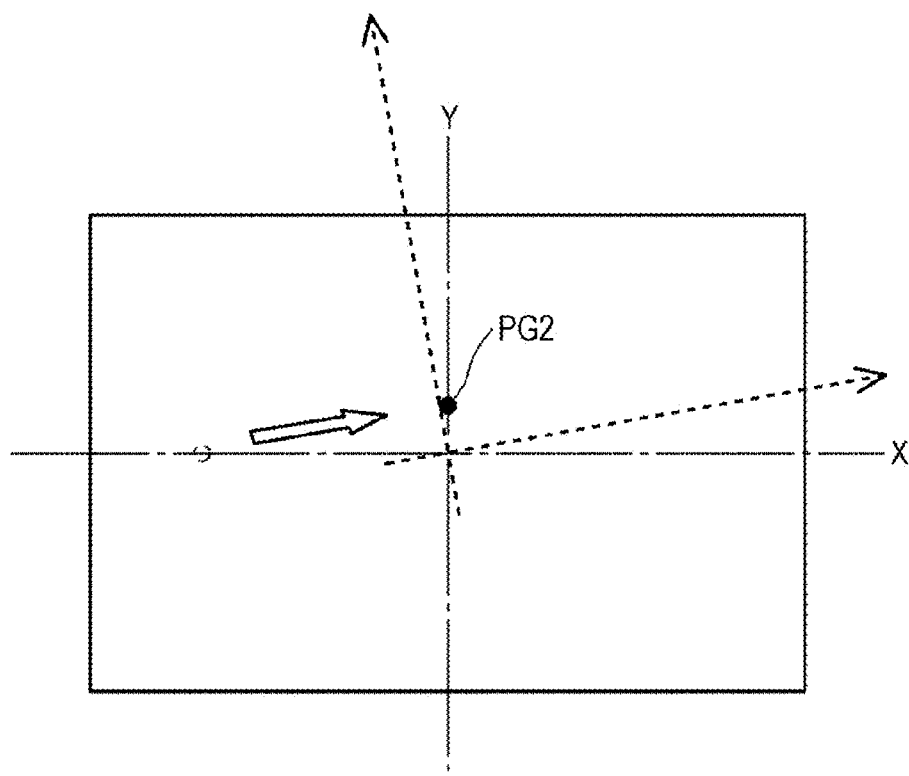
FIG. 18 is a view illustrating the centering operation in the second embodiment.

Next, as shown in FIG. 18, the center position of the imaging device 5 moves from the position PG1 in FIG. 17 to the position PG2 in FIG. 18 by the first return processing in the first direction (here, X direction). Accordingly, the amount of deviation ΔX in the X direction falls within the allowable range TL1. In addition, FIG. 18 shows a state where the center position of the imaging device 5 moves onto the Y axis (sensing axis) and the amount of deviation in the X direction is ideally corrected to zero. In addition, in the first return processing, deviation in the Y direction occurs again due to the influence of axial deviation.

Figure 19:
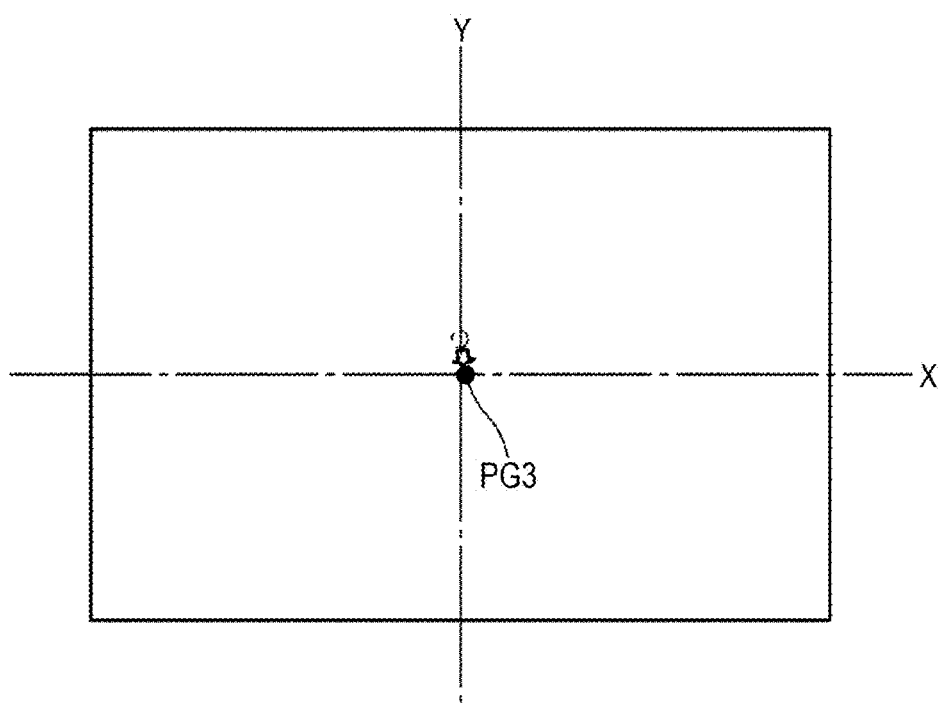
FIG. 19 is a view illustrating the centering operation in the second embodiment.

Moreover, as shown in FIG. 19, the center position of the imaging device 5 moves from the position PG2 in FIG. 18 to the position PG3 in FIG. 19 by the second return processing in the second direction (Y direction). Accordingly, the amount of deviation ΔY in the Y direction falls within the allowable range TL1. In addition, FIG. 19 shows a state where the amount of deviation in the Y direction is ideally corrected to zero. In this case, an error also remains in the X direction. However, this error is a very small value.

Figure 20:
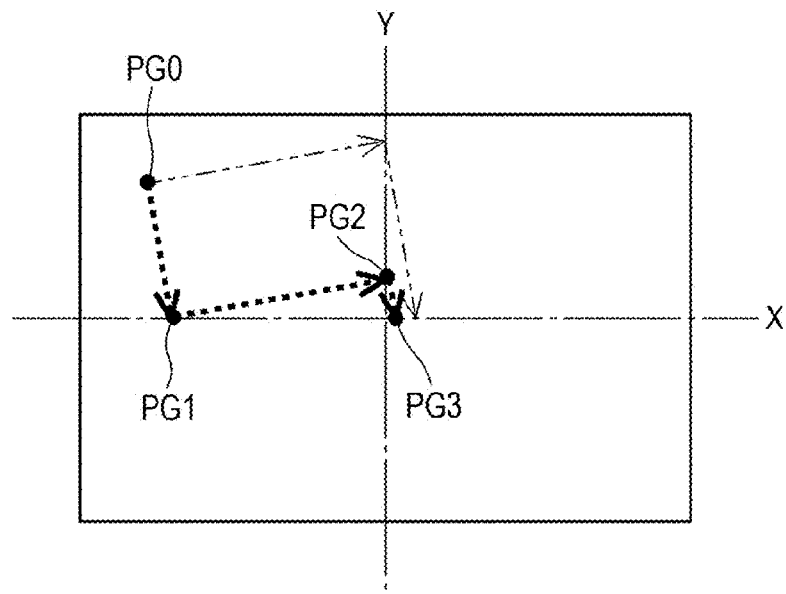
FIG. 20 is a view for comparing the centering operation in the second embodiment with the centering operation in the first embodiment.

FIG. 20 is a view for comparing the centering operation in the first embodiment with the centering operation in the second embodiment (both are centering operations immediately after exposure). In FIG. 20, the locus of the center position of the imaging device 5 in the centering operation in the second embodiment is shown by a thick dotted line. In addition, the locus of the center position of the imaging device 5 in the centering operation in the first embodiment is shown by a thin two-dot chain line.

As shown in FIG. 20, in the centering operation in the first embodiment, driving in the X direction is performed in the first return processing and then driving in the Y direction is performed in the second return processing. In this case, the final remaining error in the X direction is relatively large.

On the other hand, as shown in FIG. 20, in the centering operation immediately after exposure in the second embodiment, driving in the Y direction is first performed in the preliminary return processing. Thereafter, driving in the X direction is performed in the first return processing, and driving in the Y direction is performed in the second return processing. In this case, the final remaining error in the X direction is relatively small.

In particular, since the amount of deviation in the Y direction is reduced by the preliminary return processing, the amount of deviation in the Y direction before the second return processing is relatively small even if the amount of deviation in the Y direction occurs again by the first return processing. Accordingly, the amount of movement in the Y direction in the second return processing is reduced. As a result, the amount of deviation in the X direction caused by the second return processing can be reduced. That is, the remaining error in the X direction can be reduced.

Thus, since the amount of deviation in the Y direction is reduced by the preliminary return processing, the amount of movement in the Y direction at the time of second return processing is reduced. As a result, the remaining error in the X direction after the second return processing can be reduced.

3. Third Embodiment

A third embodiment is a modification of the second embodiment. In the third embodiment, the preliminary return processing is executed in the same manner as in second embodiment. However, in the third embodiment, the conditions for starting the driving in the preliminary return processing and the like are different from those in the second embodiment.

Figure 21:
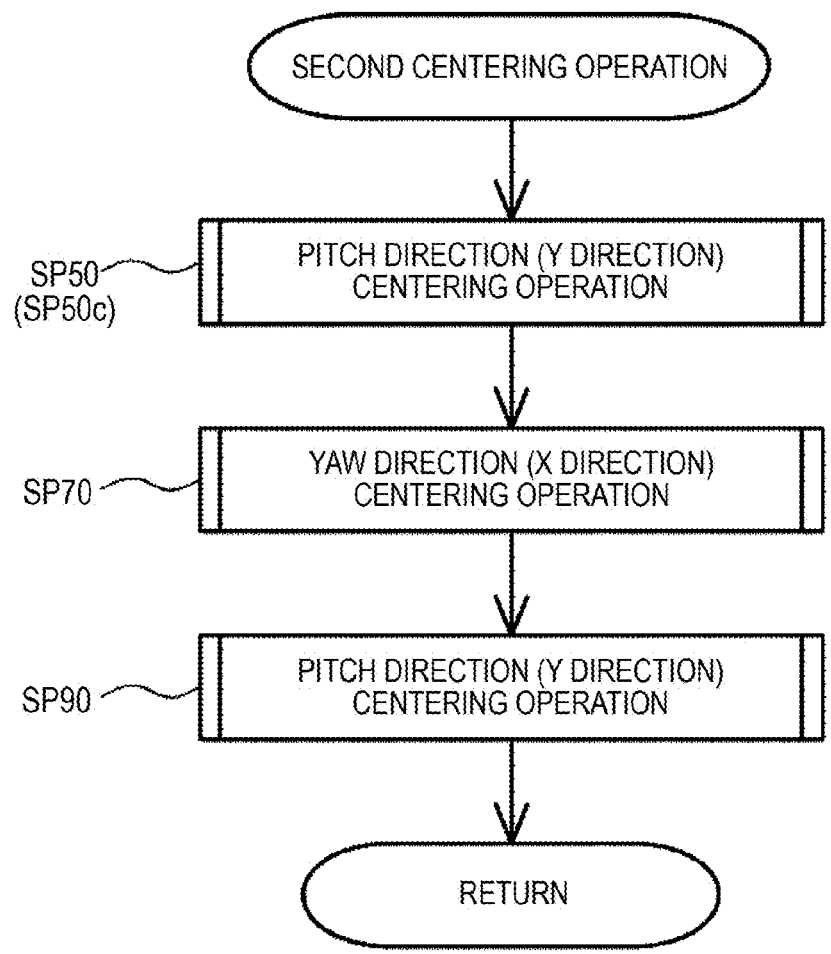
FIG. 21 is a flow chart illustrating a centering operation in a third embodiment.
Figure 22:
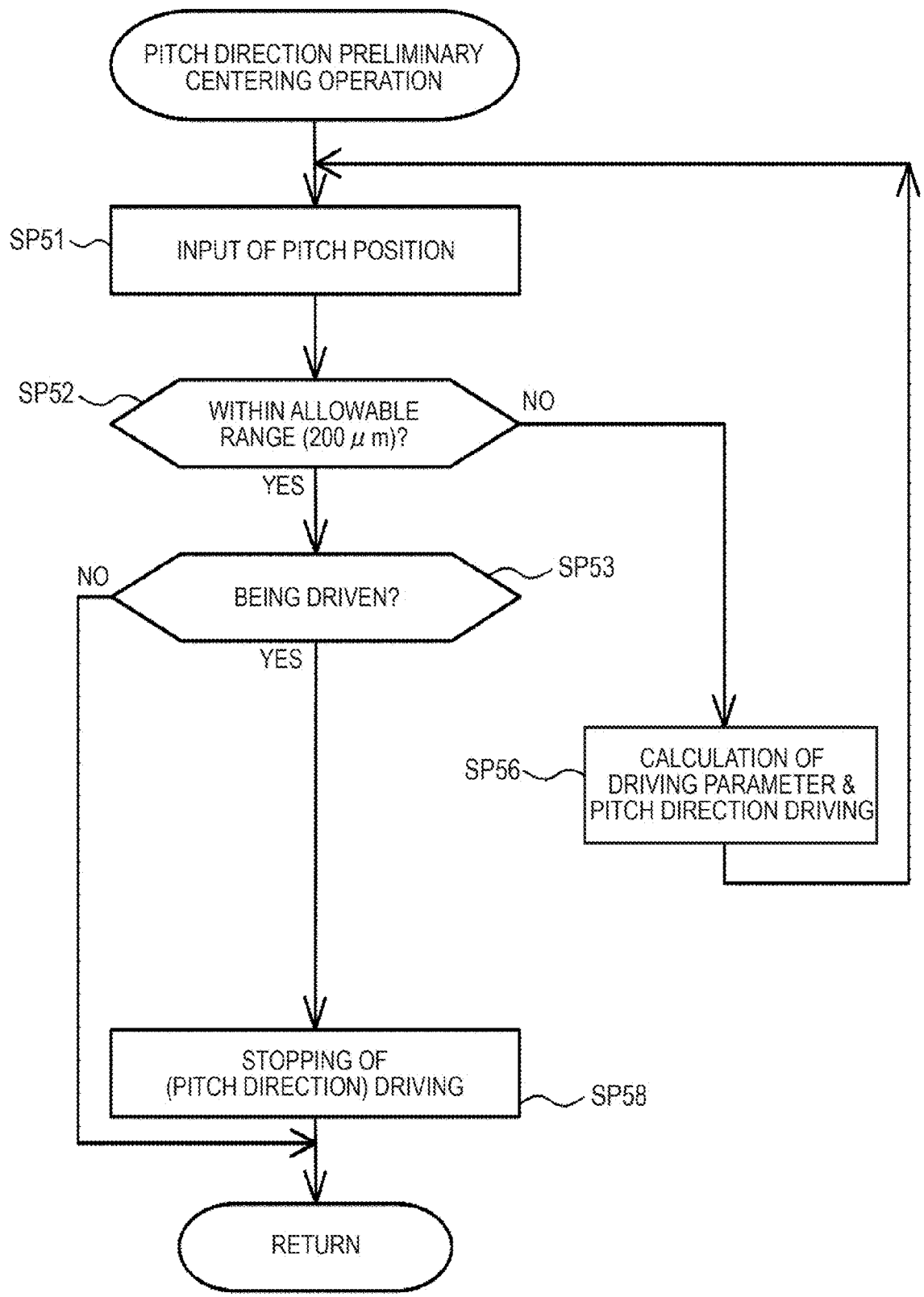
FIG. 22 is a flow chart illustrating the centering operation in the third embodiment.

FIGS. 21 and 22 are views illustrating the "centering operation immediately after exposure" in the third embodiment. As shown in FIG. 21, in the third embodiment, preliminary return processing (step SP50c) in the pitch direction (Y direction) of the actuator 7y is further executed before the return processing (step SP70) in the yaw direction, in the same manner as in the second embodiment. In addition, FIG. 22 is a view illustrating the detailed operation of step SP50c. In step SP50c, as shown in FIG. 22, different processing from step SP50b (FIG. 15) (that is, step SP90 (FIG. 12)) is executed.

As shown in FIG. 22, in step SP51, the pitch position (Y position) of the imaging device 5 is acquired and the amount of deviation ΔY between the pitch position and the reference position is calculated. Then, it is determined whether or not the amount of deviation ΔY is within the allowable range TL2 (step SP52). Specifically, if the amount of deviation ΔY is −Th2 or more and +Th2 or less, it is determined that the amount of deviation ΔY is within the allowable range TL2. Here, the value Th2 is a larger value (for example, 200 μm) than the value Th1 (for example, 50 μm). That is, the allowable range TL2 is set as a range wider than the allowable range TL1.

When it is determined that the amount of deviation ΔY exceeds the allowable range TL2, the process proceeds to step SP56. In step SP56, a driving parameter (specifically, a duty ratio in PWM control of the actuator 7y) for pitch direction driving corresponding to the amount of deviation ΔY is calculated and the driving operation in the pitch direction is executed, and then the process proceeds to step SP51.

On the other hand, when it is determined that the amount of deviation ΔY is within the allowable range TL2, the process proceeds from step SP52 to step SP53. In step SP53, it is determined whether or not the driving operation in the pitch direction has already started.

When the driving operation in the pitch direction has not started yet, the processing in step SP50 ends. That is, when it is determined that the amount of deviation ΔY is already within the allowable range TL2 in the state where driving in the pitch direction has not been performed, the imaging apparatus 1 ends the return processing (correction operation) in the pitch direction without starting the driving operation in the pitch direction.

When the driving operation in the pitch direction has already started, the process proceeds from step SP53 to step SP58. In step SP58, the driving operation in the pitch direction is stopped.

Thus, when the amount of deviation ΔY is within the allowable range TL2 in the state where driving in the pitch direction is not started, the imaging apparatus 1 ends the correction operation in the pitch direction without executing the driving operation in the pitch direction. In addition, when the amount of deviation ΔY exceeds the allowable range TL2, the imaging apparatus 1 starts the driving operation in the pitch direction. In addition, after confirming that the amount of deviation ΔY falls within the allowable range TL2, the imaging apparatus 1 immediately stops the driving operation in the pitch direction.

In other words, when the amount of deviation ΔY of the imaging device 5 falls within the allowable range TL2 at the start of the preliminary return processing (step SP50c), the imaging apparatus 1 ends the preliminary return processing without starting the driving operation of the actuator 7y. In addition, when the amount of deviation ΔY of the imaging device exceeds the allowable range TL2 at the start of the preliminary return processing (step SP50c), the imaging apparatus 1 starts the driving operation of the actuator 7y. Then, after the driving operation of the actuator 7y has started in the preliminary return processing, the imaging apparatus 1 immediately stops the driving operation of the actuator 7y if it is once determined that the amount of deviation ΔY of the imaging device 5 falls within the allowable range TL2.

In this way, the centering operation immediately after exposure is executed.

According to the third embodiment, since the centering driving is performed three time in the centering operation immediately after exposure like the second embodiment, it is possible to reduce the error caused by the "axial deviation".

Moreover, in the third embodiment, when the amount of deviation ΔY in the second direction (Y direction) immediately before the start of the "centering operation immediately after exposure" falls within the allowable range TL2, actual driving operation is not performed in the preliminary return processing. Accordingly, it is possible to reduce a time necessary for centering. That is, it is possible to reduce the centering time while reducing the error caused by the axial deviation.

In particular, the allowable range TL2 is wider than the allowable range TL1. Accordingly, since it is possible to increase a possibility that actual driving operation will not be performed in the preliminary return processing, a time necessary for centering can be reduced. That is, it is possible to increase the speed.

Moreover, in the third embodiment, when it is once confirmed that the amount of deviation ΔY falls within the allowable range TL2 after driving has started in the preliminary return processing, the imaging apparatus 1 immediately stops the driving operation in the pitch direction. Accordingly, compared with the case where the checking is performed at a plurality of points in time and/or the case where it is determined whether or not the amount of deviation ΔY falls within the allowable range TL1, the preliminary return processing can be ended relatively early. Also in this point, the speed can be increased.

In addition, in the preliminary return processing, the driving is performed such that the amount of deviation ΔY falls within the allowable range TL2 which is wider than the allowable range TL1. For this reason, the amount of deviation ΔY in the Y direction after the preliminary return processing slightly increases compared with that in the second embodiment, and the final amount of deviation ΔX in the X direction also increases slightly compared with that in the second embodiment. However, since the amount of deviation in the Y direction is reduced beforehand so as to fall within the allowable range TL2 in the preliminary return processing, the amount of movement in the Y direction can be sufficiently reduced in the second return processing (step SP90). As a result, the remaining error in the X direction after the second return processing can be reduced.

4. Fourth Embodiment

A fourth embodiment is a modification of the third embodiment.

In the third embodiment, the case was illustrated in which the preliminary return processing in the Y direction was first performed, then the return processing in the X direction was performed, and the return processing in the Y direction was finally performed. In other words, the case was illustrated in which the X direction was adopted as the first direction and the Y direction was adopted as the second direction.

In the fourth embodiment, the case will be illustrated in which processing in each direction is performed in different order from the third embodiment. That is, in the fourth embodiment, return processing is performed three times in different driving order from the driving order in the third embodiment. Specifically, in the fourth embodiment, the case will be illustrated in which preliminary return processing in the X direction is first performed, then return processing in the Y direction is performed, and return processing in the X direction is finally performed. In addition, such a situation is also expressed as a situation where the Y direction is adopted as the first direction and the X direction is adopted as the second direction, contrary to the third embodiment. Or the situation is also expressed as a situation where the preliminary return processing in the X direction using the actuator 7x, the second return processing (step SP90), and the first return processing (step SP70) are executed in this order.

Figure 23:
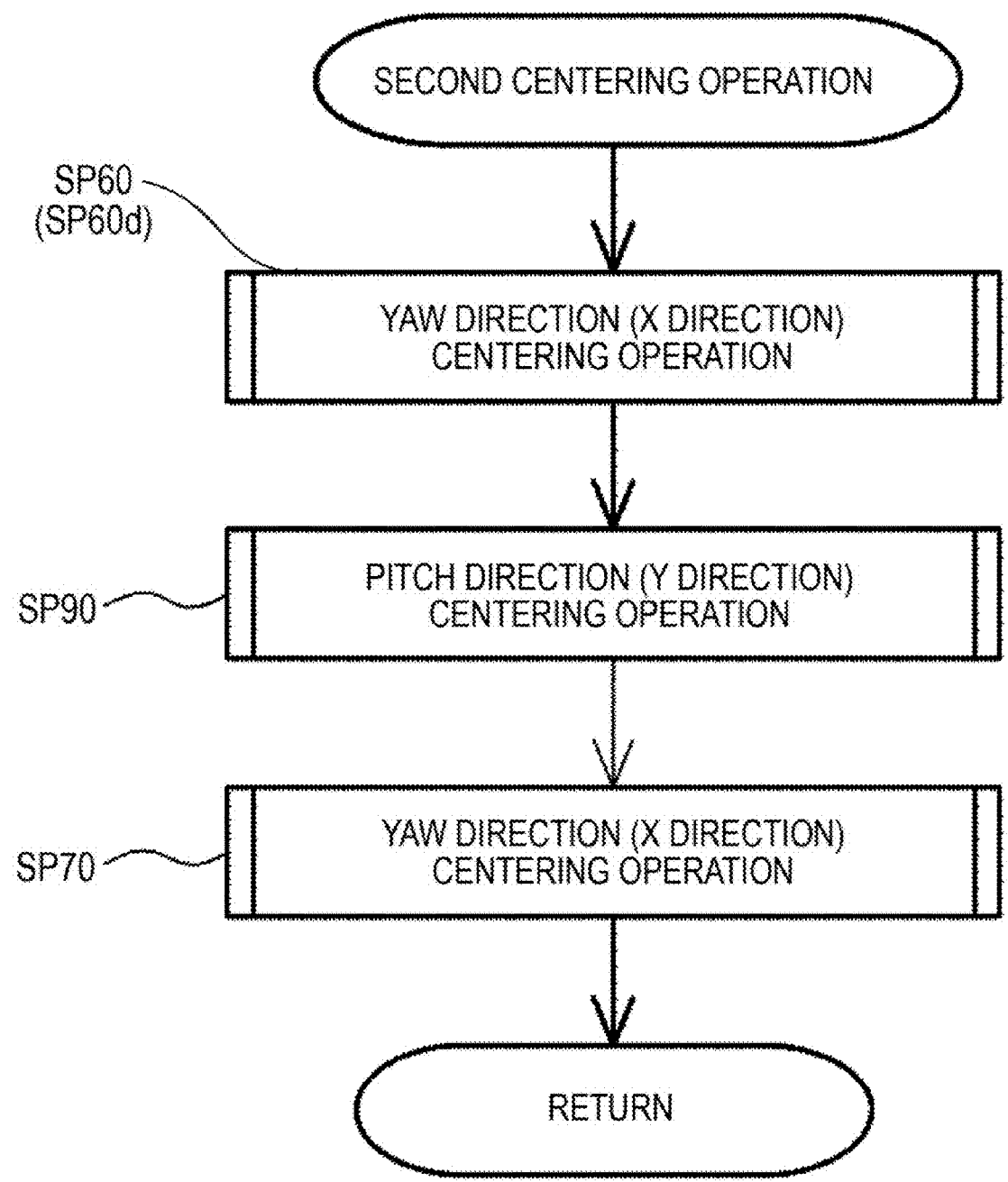
FIG. 23 is a flow chart illustrating a centering operation in a fourth embodiment.
Figure 24:
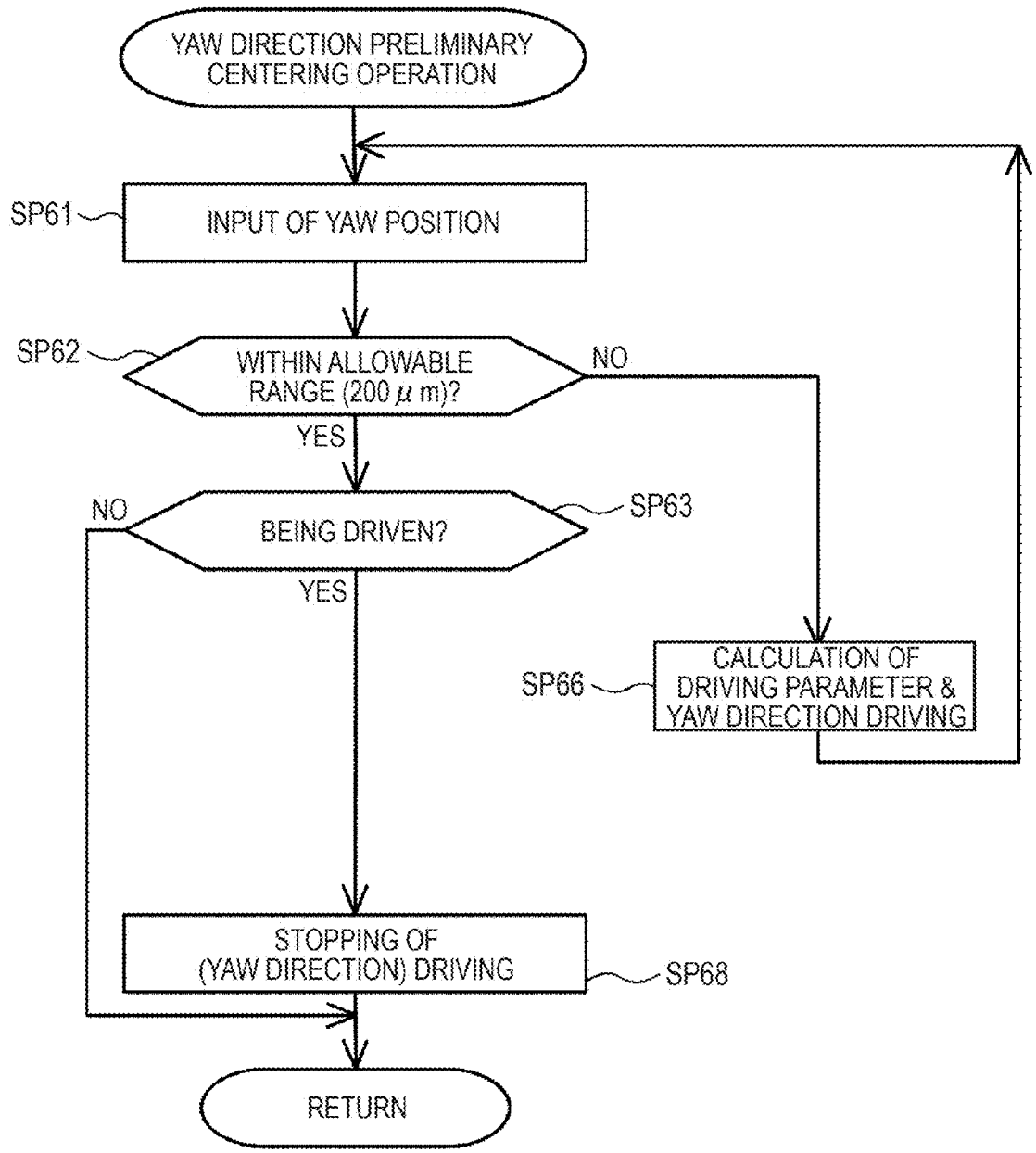
FIG. 24 is a flow chart illustrating the centering operation in the fourth embodiment.

FIGS. 23 and 24 are flowcharts illustrating an operation in the fourth embodiment.

As shown in FIG. 23, in step SP60, preliminary return processing in the yaw direction (X direction) is performed first. Then, processing of step SP90, that is, the return processing in the pitch direction (Y direction) is performed. Finally, processing of step SP70, that is, the return processing in the yaw direction (X direction) is performed.

FIG. 24 shows the detailed operation of step SP60 (SP60d). In step SP60d, the same operation as in the above-described step SP50c (FIG. 22) is executed. However, the operation in step SP60d is different from that in step SP50c in that it is not related with the pitch direction (Y direction) but related with the yaw direction (X direction).

Specifically, in the preliminary return processing (step SP60d), when the amount of deviation ΔX of the imaging device 5 falls within the allowable range TL2 at the start of the preliminary return processing, the imaging apparatus 1 ends the preliminary return processing without starting the driving operation of the actuator 7x. In addition, when the amount of deviation ΔX of the imaging device 5 exceeds the allowable range TL2 at the start of the preliminary return processing (step SP60d), the imaging apparatus 1 starts the driving operation of the actuator 7x. Then, after the driving operation of the actuator 7x has started in the preliminary return processing, the imaging apparatus 1 immediately stops the driving operation of the actuator 7x if it is once determined that the amount of deviation ΔX of the imaging device falls within the allowable range TL2.

Figure 25:
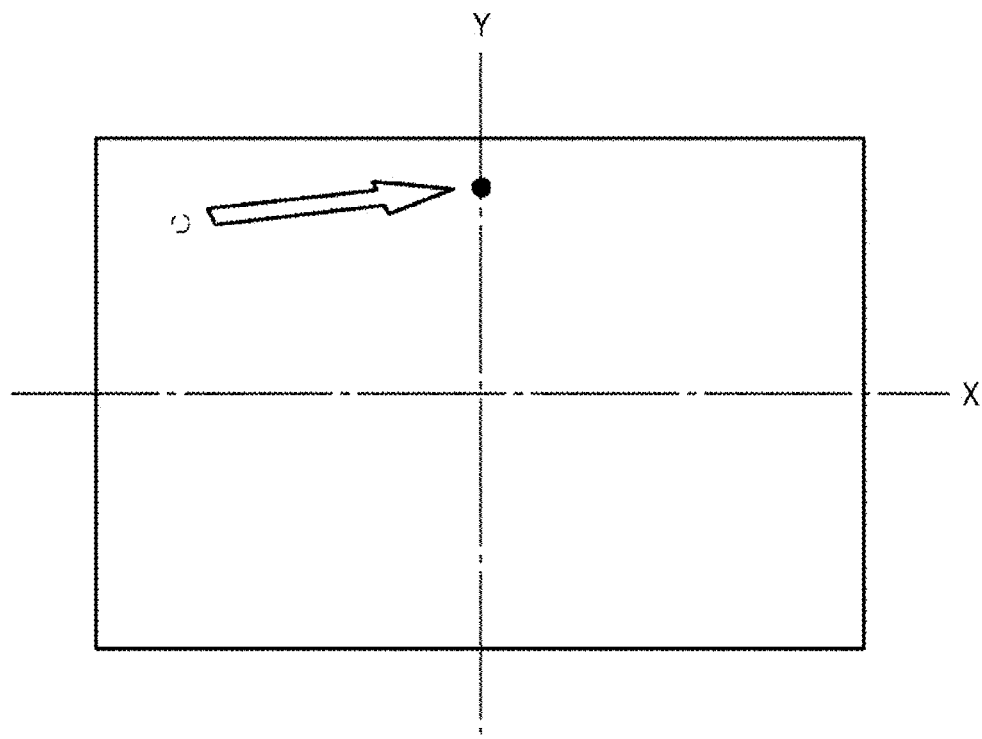
FIG. 25 is a view illustrating the centering operation in the fourth embodiment.
Figure 26:
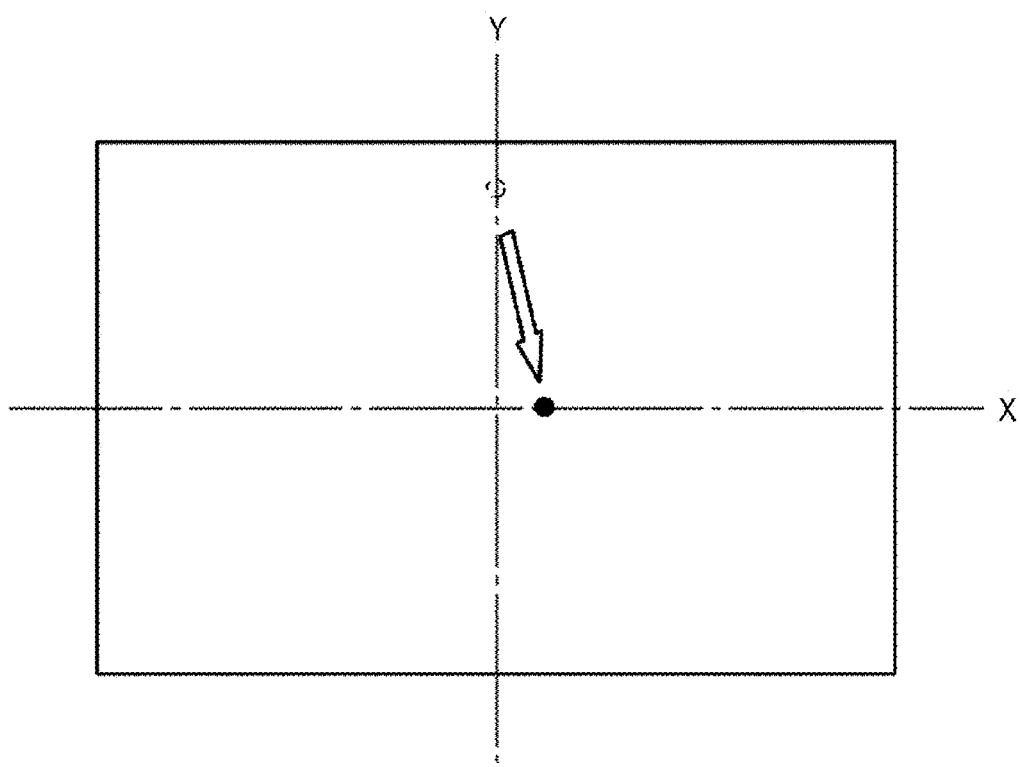
FIG. 26 is a view illustrating the centering operation in the fourth embodiment.
Figure 27:
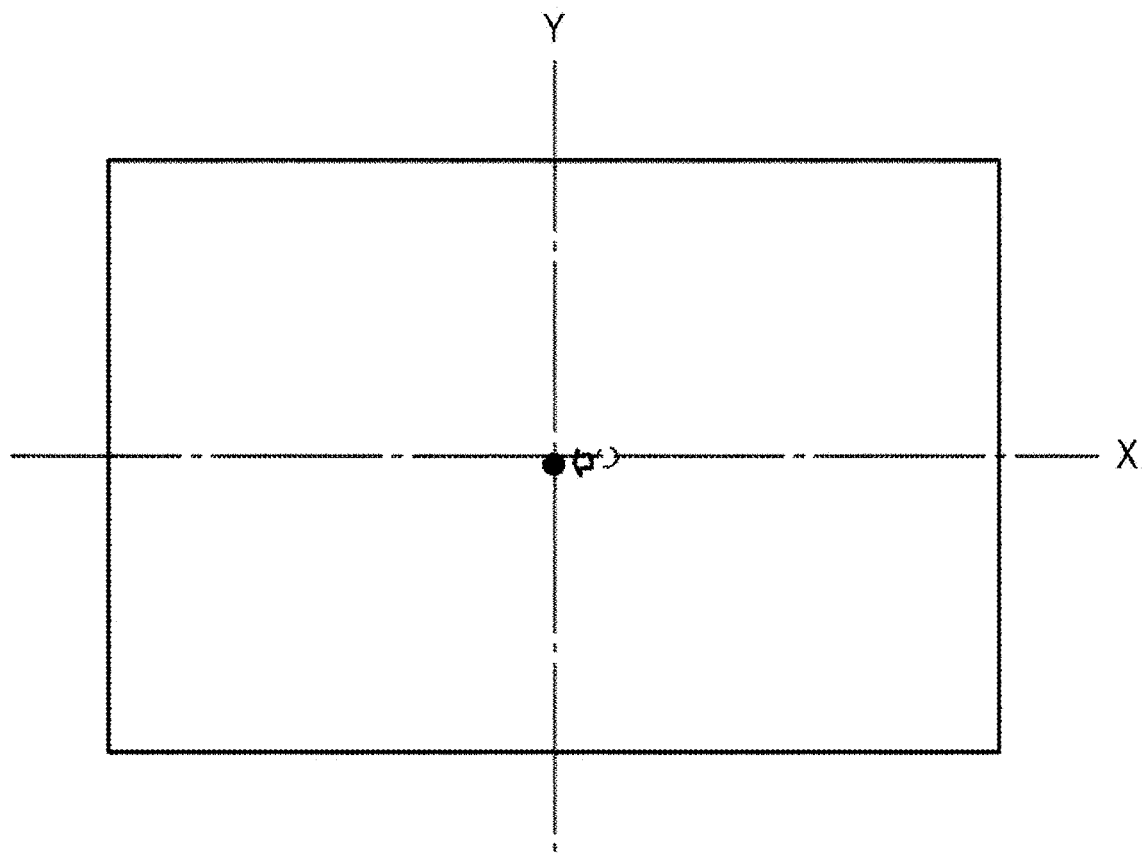
FIG. 27 is a view illustrating the centering operation in the fourth embodiment.

In addition, FIGS. 25 to 27 are views illustrating the centering operation in the fourth embodiment. An example of the operation will be described with reference to FIGS. 25 to 27. In FIGS. 25 to 27, the center position of the imaging device 5 is shown as a black point. In addition, it is assumed that the center position of the imaging device 5 immediately after exposure is a position PG0 in FIG. 16.

First, as shown in FIG. 25, the amount of deviation in the X direction falls within the allowable range TL2 (also expressed as TL4) by the preliminary return processing in the X direction. In addition, FIG. 25 shows a state where the amount of deviation in the X direction is ideally corrected to zero.

Then, as shown in FIG. 26, the amount of deviation in the Y direction falls within the allowable range TL1 (also expressed as TL3) by the preliminary return processing (step SP90) in the Y direction. In addition, FIG. 26 shows a state where the amount of deviation in the Y direction is ideally corrected to zero. In addition, in this return processing (step SP90), deviation in the X direction occurs again due to the influence of axial deviation.

In addition, as shown in FIG. 27, the amount of deviation in the X direction falls within the allowable range TL1 (also expressed as TL3) by the return processing (step SP70) in the X direction. In addition, FIG. 27 shows a state where the amount of deviation in the X direction is ideally corrected to zero. In this case, an error also remains in the Y direction. However, this error is a very small value.

According to such operations, the same effects as in the third embodiment can be achieved.

In addition, although the case where the processing in step SP60d (FIG. 24) is performed as step SP60 has been illustrated in the fourth embodiment, the present invention is not limited thereto. For example, the same processing as in step SP70 may be performed as step SP60. In this case, the same effects as in the second embodiment can be achieved.

5. Fifth Embodiment

A fifth embodiment is a modification of the third and fourth embodiments. In the fifth embodiment, both the centering control method based on the driving order (Y direction→X direction→Y direction) in the third embodiment and the centering control method based on the driving order (X direction→Y direction→X direction) in the fourth embodiment are prepared beforehand. In addition, it is determined on the basis of a predetermined standard which one of the two centering control methods is to be adopted. Specifically, the centering control method to be adopted is determined on the basis of the position of the imaging device 5 immediately before the centering operation. More specifically, the amounts of deviation ΔX and ΔY in the X and Y directions are calculated on the basis of the position of the imaging device 5 immediately before the centering operation. In addition, the centering control method in which a direction corresponding to the relatively small one of the two amounts of deviation ΔX and ΔY is set as the driving direction in preliminary return processing is determined as the centering control method to be adopted.

Figure 28:
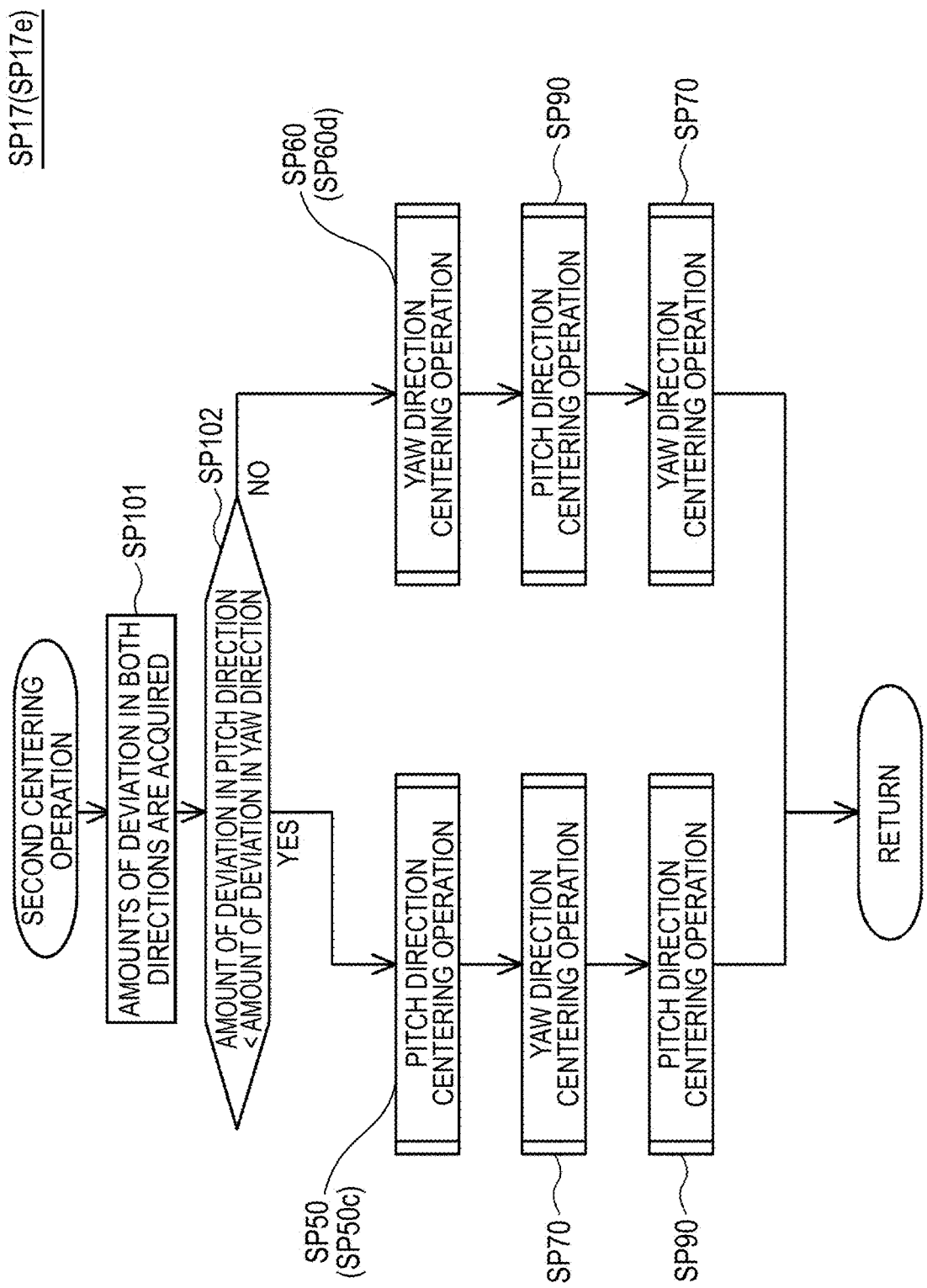
FIG. 28 is a flow chart illustrating a centering operation in a fifth embodiment.

FIG. 28 is a flow chart illustrating the "centering operation immediately after exposure" in the fifth embodiment.

As shown in FIG. 28, in the fifth embodiment, the amount of deviation ΔX in the yaw direction (X direction) and the amount of deviation ΔY in the pitch direction (Y direction) are first acquired referring to the reference position and the current position of the imaging device 5 in step SP101.

Then, in step SP102, when the amount of deviation ΔY in the pitch direction is smaller than the amount of deviation ΔX in the yaw direction, the same centering control method as in the third embodiment is adopted. That is, processings in steps SP50c, SP70, and SP90 are executed in this order. On the other hand, when the amount of deviation ΔY in the pitch direction is larger than the amount of deviation ΔX in the yaw direction, the same centering control method as in the fourth embodiment is adopted. That is, processings in steps SP60d, SP90, and SP70 are executed in this order.

In this case, the same effects as in the third or fourth embodiment can be achieved. For example, when both the amount of deviation ΔX in the pitch direction and the amount of deviation ΔY in the yaw direction are outside the allowable range TL2 from the beginning, the error caused by axial deviation can be reduced by performing the driving operation three times. That is, even in the case where there is axial deviation, the error caused by the axial deviation can be reduced and the centering operation can be precisely performed accordingly.

In addition, in the fifth embodiment, one of the two centering control method is appropriately selected and executed. Accordingly, the more appropriately centering method can be executed.

More specifically, in the fifth embodiment, a direction, which corresponds to the relatively small amount of deviation, of the two driving directions (X and Y directions) is adopted as a target direction in the preliminary return processing. As a result, when the amount of deviation in one direction of the amounts of deviation ΔX and ΔY in two directions immediately before the start of the centering operation falls within the predetermined allowable range TL2, actual driving operation is not performed in the preliminary return processing. Accordingly, especially a time necessary for centering can be reduced. That is, it is possible to increase the speed.

For example, the case is assumed in which the amount of deviation ΔY in the pitch direction is outside the predetermined allowable range TL2 from the beginning and the amount of deviation ΔX in the yaw direction is within the predetermined allowable range TL2 from the beginning. In this case, the process proceeds from step SP102 to step SP60d. In addition, the yaw direction is adopted as a target direction in the preliminary return processing, and actual driving operation in the yaw direction is not executed in the preliminary return processing. In addition, the return processing in the pitch direction and the return processing in the yaw direction are continuously executed in this order. Since actual driving operation in the yaw direction is not executed in the preliminary return processing, it is possible to reduce a total time which is necessary when performing the return processing three times. As a result, the same operation as in the fourth embodiment is performed in this case. However, compared with the case where the operation in the third embodiment is executed, the driving operation in the preliminary return processing is not executed. Accordingly, it is possible to reduce a total time necessary for the centering operation.

Thus, according to the fifth embodiment, compared with the case where the driving direction is fixed in the preliminary return processing like the third or fourth embodiment, it is possible to further increase a possibility that actual driving operation will not be performed in the preliminary return processing. Accordingly, it is possible to reduce a time necessary for centering.

Particularly in the fifth embodiment, the allowable range TL2 (TL4) wider than the allowable range TL1 (TL3) is adopted as an allowable range of the amount of deviation in the preliminary return processing. Accordingly, it is possible to further increase a possibility that actual driving operation will not be performed in the preliminary return processing. However, the allowable range TL1 may also be adopted as an allowable range of the amount of deviation in the preliminary return processing, without being limited to that described above.

6. Modification

While the embodiments of the present invention have been described, the present invention is not limited to those described above.

For example, although the case where the idea of the present invention is applied to the centering operation immediately after exposure has been illustrated in each of the embodiments described above, the present invention is not limited to the case. In other words, the idea may also be applied to a centering operation which is performed at different timing from each of the embodiments described above.

Figure 29:
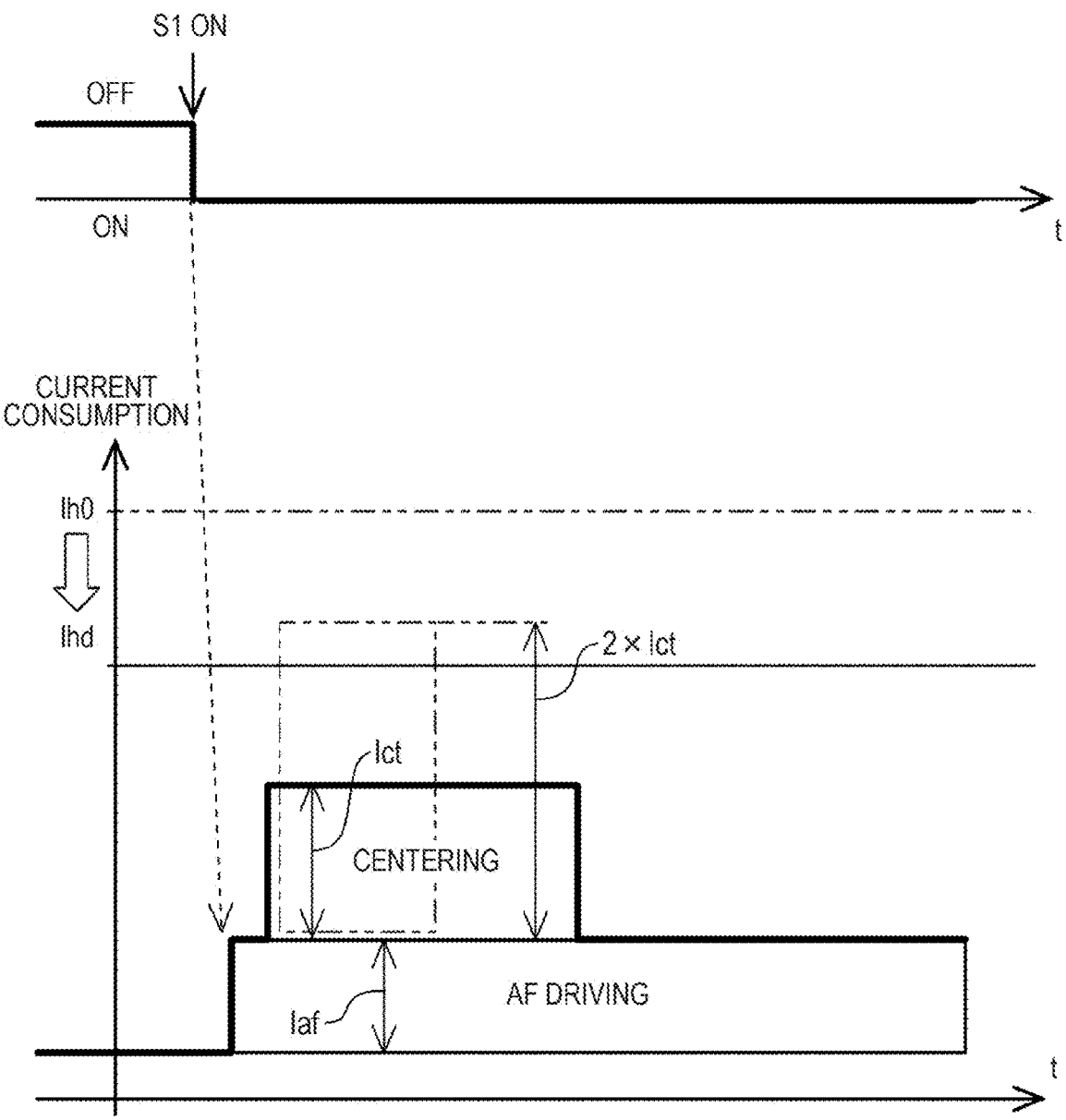
FIG. 29 is a view schematically illustrating various kinds of operations in a modification (after S1 has been set to ON).

Specifically, the idea of the present invention may be applied to a centering operation executed when the release button 11 has been pressed up to the half-press state S1 (or more to the point, a centering operation when S1 is ON). FIG. 29 is a timing chart illustrating the situation in the modification. As shown in FIG. 29, when the release button 11 has been set to the half-press state S1, the AF operation (driving operation of an AF lens) is executed. In this case, the situation is assumed in which a centering operation is executed simultaneously with the AF operation.

As shown in FIG. 29, when the instantaneous maximum permissible value of the current supplied from a battery is reduced from the value Ih0 to the value Ihd, for example, the sum of the above-described current Ict2 (=2×Ict) necessary for the centering operation, the current Iaf necessary for the AF operation, and the like exceeds the value Ihd. In this case, it is difficult to execute the centering operation stably. In addition, the centering operation may be performed after the AF operation is completed (that is, both the operations may be sequentially performed). In this case, however, a time until both the operations are completed is longer.

Therefore, in the modification shown in FIG. 29, separate centering operations are sequentially executed for two axial directions similar to each of the embodiments described above. In this case, the instantaneous maximum current value in the centering operation can be suppressed to the half, that is, from the value Ict2 (=2×Ict) to the value Ict, for example. Accordingly, it becomes possible to execute the centering operation and the AF driving operation (automatic focus operation) simultaneously (in parallel). That is, by reducing the total instantaneous current consumption, it becomes possible to improve the tolerance of simultaneous execution of the centering operation in the shake correction device and an operation other than the centering operation.

In addition, the same idea as described above may be applied in the "centering operation immediately before exposure" which is performed immediately after the release button 11 is pressed up to the full-press state S2. In this case, simultaneous execution of the centering operation and the mirror-up operation or the like is allowed and becomes easy.

Moreover, although the "two axes simultaneous driving operation" is executed and the "two axes sequential driving operation" is not executed in the initial centering operation in each of the embodiments described above, the present invention is not limited thereto. For example, the "two axes sequential driving operation" may also be executed in the initial centering operation.

In addition, although the case where the shake correction control section 21 is provided outside the shake correction mechanism 7 has been illustrated in each of the embodiments, the present invention is not limited thereto. For example, the shake correction device may also be formed by providing the same control section as the shake correction control section 21 in the shake correction mechanism 7.

In addition, although the method of correcting the shake of the imaging apparatus 1 by driving the imaging device 5 has been illustrated in each of the embodiments, the present invention is not limited thereto, and the shake of the imaging apparatus 1 may also be corrected by driving an imaging component other than the imaging device 5. For example, the shake of the imaging apparatus 1 may be corrected by driving some lenses of the lens group 37 (FIG. 3) of the photographing lens unit 3 in two directions within the plane perpendicular to the optical axis. More specifically, the idea may be applied in a replaceable photographing lens or the like provided in a shake correction unit (shake correction device).

The present application contains subject matter related to that disclosed in Japanese Priority Patent Application JP 2009-000513 filed in the Japan Patent Office on Jan. 6, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   first driving means for driving an imaging component, which is related with either an imaging optical system or an imaging device, in a first direction;
   second driving means for driving the imaging component in a second direction which is different from the first direction;
   shake detection means for detecting a shake of the imaging apparatus; and
   control means for correcting the shake of the imaging apparatus by driving the imaging component, based on a detection result of the shake of the imaging apparatus, obtained by the shake detection means, using the first and second driving means,
   wherein the control means sequentially executes first return processing in the first direction using the first driving means and second return processing in the second direction using the second driving means when returning the imaging component to a reference position at a predetermined timing, and
   wherein the control means executes a centering operation and a pixel data reading operation simultaneously.

2. The imaging apparatus according to claim 1, wherein the control means executes the first return processing before the second return processing and executes preliminary return processing in the second direction using the second driving means before the first and second return processings are executed.

3. The imaging apparatus according to claim 2, wherein
at a start of the second return processing, the control means ends the second return processing without starting a driving operation of the second driving means when an amount of deviation from the reference position in the second direction of the imaging component falls within a first allowable range and starts the driving operation of the second driving means when the amount of deviation from the reference position in the second direction of the imaging component exceeds the first a range,
at a start of the preliminary return processing, the control means ends the preliminary return processing without starting the driving operation of the second driving means when the amount of deviation from the reference position in the second direction of the imaging component falls within a second allowable range and starts the driving operation of the second driving means when the amount of deviation from the reference position in the second direction of the imaging component exceeds the second allowable range, and
the second allowable range is wider than the first allowable range.

4. The imaging apparatus according to claim 2, wherein
after a driving operation of the second driving means has started in the second return processing, the control means stops the driving operation of the second driving means upon determining at one of a predetermined plurality of points in time, that an amount of deviation from the reference position in the second direction of the imaging component falls within a first allowable range, and
after the driving operation of the second driving means has started in the preliminary return processing, the control means stops the driving operation of the second driving means upon determining that the amount of deviation from the reference position in the second direction of the imaging component falls within a second allowable range.

5. The imaging apparatus according to claim 1, wherein the control means selects one of a first control method, in which preliminary return processing in the second direction using the second driving means, the first return processing, and the second return processing are executed in this order, and a second control method, in which preliminary return processing in the first direction using the first driving means, the second return processing, and the first return processing are executed in this order, based on a predetermined standard, and executes the selected control method.

6. The imaging apparatus according to claim 5, wherein at a start of an operation of returning the imaging component to the reference position, the control means selects the first control method when an amount of deviation from the reference position in the second direction of the imaging component is smaller than an amount of deviation from the reference position in the first direction of the imaging component.

7. The imaging apparatus according to claim 6, wherein
in a case of selecting the first control method, the control means ends the second return processing without starting a driving operation of the second driving means when a first amount of deviation, which is the amount of deviation from the reference position in the second direction of the imaging component, falls within a first allowable range at a start of the second return processing, starts the driving operation of the second driving means when the first amount of deviation exceeds the first allowable range at the start of the second return processing, ends the preliminary return processing using the second driving means without starting the driving operation of the second driving means when a second amount of deviation, which is the amount of deviation, from the reference position in the second direction of the imaging component, falls within a second allowable range at a start of the preliminary return processing using the second driving means, and starts the driving operation of the second driving means when the second amount of deviation exceeds the second allowable range at the start of the preliminary return processing using the second driving means,
in a case of selecting the second control method, the control means ends the first return processing without starting a driving operation of the first driving means when a third amount of deviation, which is the amount of deviation from the reference position in the first direction of the imaging component, falls within a third allowable range at a start of the first return processing, starts the driving operation of the first driving means when the third amount of deviation exceeds the third allowable range at the start of the first return processing, ends the preliminary return processing using the first driving means without starting the driving operation of the first driving means when a fourth amount of deviation, which is the amount of deviation from the reference position in the first direction of the imaging component, falls within a fourth allowable range at a start of the preliminary return processing using the first driving means, and starts the driving operation of the first driving means when the fourth amount of deviation exceeds the fourth allowable range at the start of the preliminary return processing using the first driving means, and
the second allowable range is wider than the first allowable range and the fourth allowable range is wider than the third allowable range.

8. The imaging apparatus according to claim 1, wherein the imaging component includes the imaging device.

9. The imaging apparatus according to claim 1, wherein the control means sequentially executes the first return processing using the first driving means and the second return processing using the second driving means when executing an operation of reading pixel data regarding an actual photographing image from the imaging device and an operation of returning the imaging component to the reference position in parallel.

10. The imaging apparatus according to claim 1, wherein the control means sequentially executes the first return processing using the first driving means and the second return processing using the second driving means when executing an automatic focus operation and an operation of returning the imaging component to the reference position in parallel.

11. The imaging apparatus according to claim 1, wherein the control means executes the centering operation sequentially, either after exposure or other than after exposure.

12. A shake correction device comprising:
first driving means for driving an imaging component in a first direction;
second driving means for driving the imaging component in a second direction which is different from the first direction;

shake detection means for detecting a shake of an imaging apparatus; and control means for correcting the shake of the imaging apparatus by driving the imaging component based on a detection result of the shake of the imaging apparatus obtained by the shake detection means, using the first and second driving means, wherein the control means sequentially executes first return processing in the first direction using the first driving means and second return processing in the second direction using the second driving means when returning the imaging component to a reference position at a predetermined timing, and wherein the control means executes a centering operation and a pixel data reading operation simultaneously.

13. An imaging apparatus comprising:

a first driving unit configured to drive an imaging component in a first direction;

a second driving unit configured to drive the imaging component in a second direction which is different from the first direction;

a shake detecting unit to detect a shake of the imaging apparatus; and a control unit configured to correct the shake of the imaging apparatus by driving the imaging component, based on a detection result of the shake of the imaging apparatus obtained by the shake detecting unit, using the first and second driving units, wherein the control unit sequentially executes first return processing in the first direction using the first driving unit and second return processing in the second direction using the second driving unit when returning the imaging component to a reference position at a predetermined timing, and wherein the control unit executes a centering operation and a pixel data reading operation simultaneously.

14. A shake correction device comprising:

a first driving unit configured to drive an imaging component in a first direction;

a second driving unit configured to drive the imaging component in a second direction which is different from the first direction;

a shake detecting unit to detect a shake of an imaging apparatus; and a control unit configured to correct the shake of the imaging apparatus by driving the imaging component based on a detection result of the shake of the imaging apparatus obtained by the shake detecting unit, using the first and second driving units, wherein the control unit sequentially executes first return processing in the first direction using the first driving unit and second return processing in the second direction using the second driving unit when returning the imaging component to a reference position at a predetermined timing, and wherein the control unit executes a centering operation and a pixel data reading operation simultaneously.

* * * * *